US009800396B1

(12) United States Patent
Kuo et al.

(10) Patent No.: US 9,800,396 B1
(45) Date of Patent: Oct. 24, 2017

(54) TRANSMITTER AND RECEIVER

(71) Applicant: INDUSTRIAL TECHNOLOGY RESEARCH INSTITUTE, Hsinchu (TW)

(72) Inventors: Fang-Yao Kuo, Taichung (TW); Che-Yang Chiang, Hsinchu (TW); Shih-Chieh Yen, Zhudong Township (TW); Wen-Chiang Chen, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 15/389,821

(22) Filed: Dec. 23, 2016

(30) Foreign Application Priority Data

Dec. 16, 2016 (TW) .............................. 105141826 A

(51) Int. Cl.
H04L 5/14 (2006.01)
H04L 5/04 (2006.01)

(52) U.S. Cl.
CPC ............. *H04L 5/1423* (2013.01); *H04L 5/04* (2013.01)

(58) Field of Classification Search
CPC ................................. H04L 5/1423; H04L 5/04
See application file for complete search history.

(56) References Cited

U.S. PATENT DOCUMENTS

| 6,421,021 | B1 | 7/2002 | Rupp et al. |
| 6,822,615 | B2 | 11/2004 | Quan et al. |
| 7,446,601 | B2 | 11/2008 | LeChevalier |
| 7,671,687 | B2 | 3/2010 | LeChevalier |
| 7,728,772 | B2 | 6/2010 | Mortazawi et al. |
| 8,248,320 | B2 | 8/2012 | Mason et al. |
| 8,358,249 | B2 | 1/2013 | Toso et al. |
| 2008/0232816 | A1* | 9/2008 | Hoshida .................. H04J 14/06 398/152 |

(Continued)

OTHER PUBLICATIONS

Anonymous, "Lens (optics)," Wikipedia, the free encyclopedia, Dec. 29, 2016 (last modified Dec. 21, 2016), pp. 1-14.
Cheng et al., "Study of 2-bit Antenna-Filter-Antenna Elements for Reconfigurable Millimeter-Wave Lens Arrays," IEEE Transactions on Microwave Theory and Techniques, vol. 54, No. 12, Dec. 2006, pp. 4498-4506.
Costa et al., "Compact Beam-Steerable Lens Antenna for 60-GHz Wireless Communications," IEEE Transactions of Antennas and Propagation, vol. 57, No. 10, Oct. 7, 2009 (first published Aug. 4, 2009), pp. 2926-2933.
Harvey et al., "Spatial Power Combining for High-Power Transmitters," Microwave, Dec. 2000, pp. 48-59.

(Continued)

*Primary Examiner* — Syed Haider
(74) *Attorney, Agent, or Firm* — Birch, Stewart, Kolasch & Birch, LLP

(57) ABSTRACT

The present invention relates to a transmitter and a receiver including multiple first and second transceiving units. Each of the first and the second transceiving units includes a first and a second radiation slices and a first and a second transceiving circuits disposed thereon. In the transmitter, the first and the second transceiving units receive first and second internal transmission signals at first and second polarization from the first and the second radiation slices, and transmit first and second external transmission signals generated from transformation through the first and the second radiation slices. In the receiver, the first and the second transceiving units receive first and second external reception signals at first and second polarization through the first and the second radiation slices, and transmit first and second internal reception signals at first and second polarization generated from transformation through the first and the second radiation slices.

20 Claims, 25 Drawing Sheets

(56) References Cited

U.S. PATENT DOCUMENTS

| | | | |
|---|---|---|---|
| 2011/0065390 A1* | 3/2011 | Asplund | H01Q 1/246 455/63.1 |
| 2012/0235876 A1* | 9/2012 | Harper | H01Q 9/28 343/848 |
| 2015/0288438 A1 | 10/2015 | Maltsev et al. | |
| 2016/0056523 A1* | 2/2016 | Olsson | H01Q 1/1257 342/359 |
| 2017/0062952 A1* | 3/2017 | Sundararajan | H01Q 21/26 |

OTHER PUBLICATIONS

Imbert et al., "Design and Performance Evaluation of a Dielectric Flat Lens Antenna for Millimeter-Wave Applications," IEEE Antennas and Wireless Propagation Letters, vol. 14, Feb. 4, 2015 (first published Oct. 15, 2014), pp. 342-345.

Kaouach et al., "X-Band Transmit-Arrays with Linear and Circular Polarization," European Conference on Antennas and Propagation 2010, Barcelona, Apr. 12-16, 2010, 5 pages.

Popović et al., "Quasi-Optical Transmit/Receive Front Ends," IEEE Transactions on Microwave Theory and Techniques, vol. 46, No. 11, Nov. 1998, pp. 1964-1975.

Porter et al., "Dual-Polarized Slot-Coupled Patch Antennas on Duroid with Teflon Lenses for 76.5 GHz Automotive Radar Systems," IEEE Transactions on Antennas and Propagation, vol. 47, No. 12, Dec. 1999, pp. 1836-1842.

Remez et al., "Dual-Polarized Tapered Slot-Line Antenna Array Fed by Rotman Lens Air-Filled Ridge-Port Design," IEEE Antennas and Wireless Propagation Letters, vol. 8, Aug. 4, 2009 (first published Jun. 10, 2009), pp. 847-851.

Remez et al., "Dual-Polarized Wideband Widescan Multibeam Antenna System From Tapered Slotline Elements Array," IEEE Antennas and Wireless Propagation Letters, vol. 4, 2005, pp. 293-296.

Schulwitz et al., "A Compact Dual-Polarized Multibeam Phased-Array Architecture for Millimeter-Wave Radar," IEEE Transactions on Microwave Theory and Techniques, vol. 53, No. 11, Nov. 2005, pp. 3588-3594.

* cited by examiner

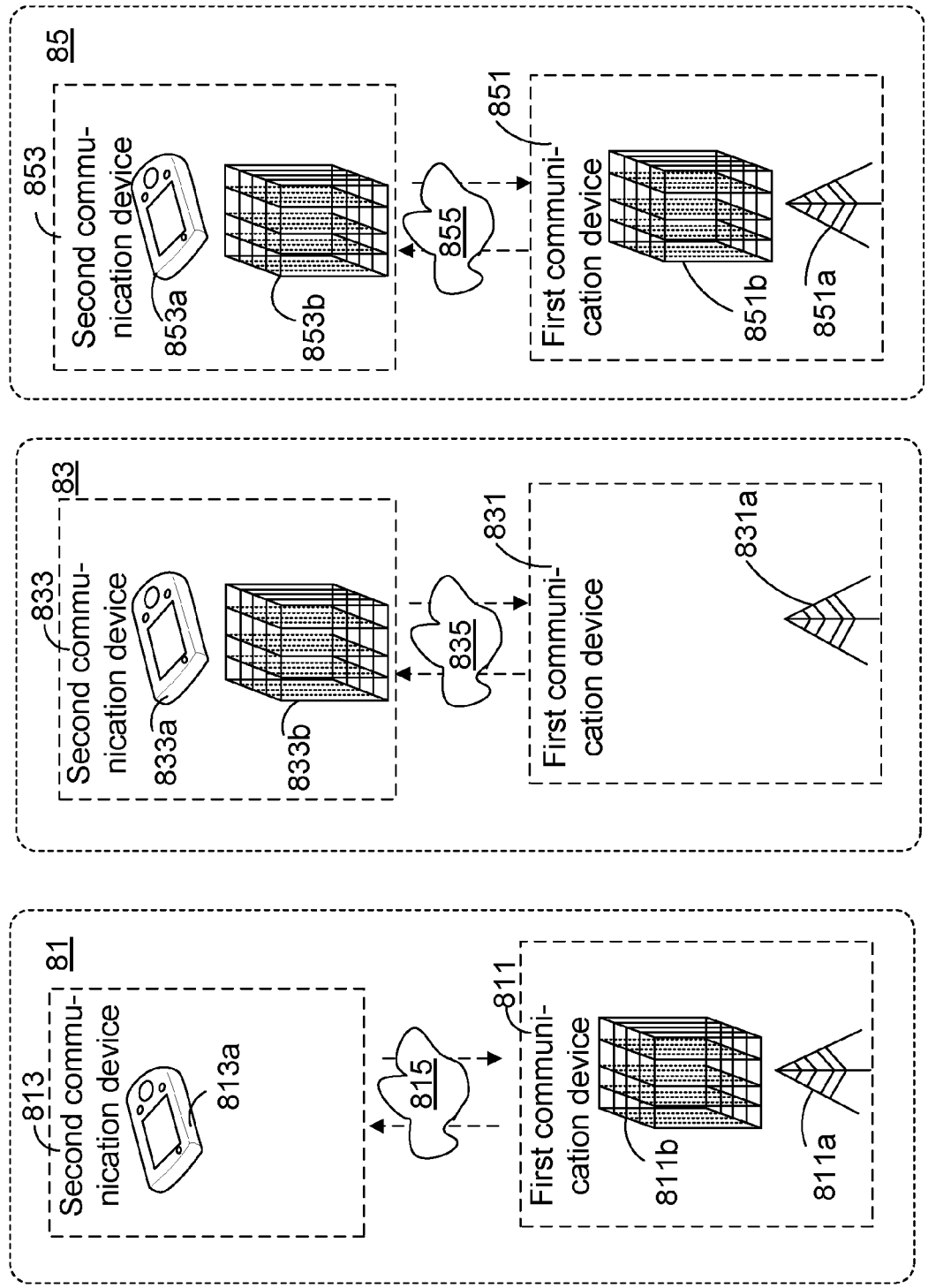

TRANSMITTER AND RECEIVER

CROSS-REFERENCE TO RELATED APPLICATION

This application claims the benefit of Taiwan application Serial No. 105141826, filed Dec. 16, 2016, the disclosure of which is incorporated by reference herein in its entirety.

TECHNICAL FIELD

The present invention relates to a transmitter and a receiver, and more particularly to a transmitter and a receiver for transmitting and/or receiving dual-polarized high-frequency wireless communication signals.

BACKGROUND

With rapid growth of wireless communication information quantity, demand for communication quality becomes stricter. The 5th generation mobile networks (5G) of the wireless communication technologies meet the operation requirements of high rate, high capacity and high quality. Since the current available bands in spectrum are highly congested, applications turn toward higher-frequency bands (>6 GHz). In these bands, the bandwidth for a single system is wider (for example, about 500 MHz to 2 GHz), and data transmission capacity and system efficiency are increased. To ensure transmission quality of wireless communication signals, high gain antennas are used to transmit wireless communication signals in the prior arts.

Please refer to FIG. 1A, a schematic diagram illustrating a transceiver which transmits wireless communication signals in a low-frequency band and utilizes a high gain antenna. In order to transmit the signals to a wider range, a transceiver 13 using a low-frequency band (for example, 3G band) to transmit the wireless communication signals will utilize a radiating antenna 13b with a greater transmit power. The transceiver 13 includes a radiating antenna 13b with a greater transmit power and a radio frequency (RF) and base band (BB) circuit 13a. A controller 11 controls the radio frequency and base band circuit (RF+BB) 13a to generate wireless transmission signals which are then emitted into air through the radiating antenna 13b. However, the antenna 13b with greater transmit power usually generates a lot of heat and increases temperature of the transceiver 13.

Due to factors of higher path loss, lower penetration and higher noise in the 5G band, higher power is required for the transceiver to transmit the wireless communication signals in the 5G band. As mentioned above, a radiating antenna 13b with higher transmit power will generate more heat so as to affect the performance of the transceiver 13. Hence, the transceiver 13 in FIG. 1A is not proper for the 5G band. Another conventional transceiver takes advantage of multiple radiating antennas with lower transmit power.

Please refer to FIG. 1B, a schematic diagram illustrating a transceiver utilizing multiple antennas with lower transmit power. The transceiver 17 includes a plurality of radiating antennas 17b with lower transmit power and a radio frequency and base band circuit 17a. The antennas 17b in this application should be used with a plurality of associated amplifiers. A plurality of amplifiers are disposed in the radio frequency and base band circuit 17a so as to enhance the signal transmission of the transceiver due to the power gain of the amplifiers. Nevertheless, while using the multiple radiating antennas 17b with lower transmit power, the wireless communication signals generated by the radio frequency and base band circuit 17a under control of the controller 15 should be transmitted through complicated signal lines. With increasing number of the antennas, complexity of wiring and control of the transceiver 17 is seriously increased.

Therefore, how to provide an efficient and easily-controlled transceiver for high-frequency applications is an outstanding issue.

SUMMARY

The present invention is directed to a transmitter and a receiver for transmitting and/or receiving a dual-polarized high-frequency wireless communication signal.

According to a first embodiment of the present invention, a transmitter is provided for transmitting at least a first external transmission signal at first polarization and transmitting at least a second external transmission signal at second polarization. The transmitter includes: a plurality of first transceiving units and a plurality of second transceiving units. Each of the first transceiving units includes: a first radiation slice and a first transceiving circuit. The first radiation slice has a first widthwise edge and a first lengthwise edge parallel to a first direction and a third direction, respectively. The first transceiving circuit is disposed on the first radiation slice. The first transceiving circuit receives at least a first internal transmission signal at the first polarization from a first end of the first lengthwise edge, performing first transmitting-transformation of the at least a first internal transmission signal to generate the at least a first external transmission signal, and feeds the at least a first external transmission signal into a second end of the first lengthwise edge. Each of the second transceiving units includes: a second radiation slice and a second transceiving circuit. The second radiation slice has a second widthwise edge and a second lengthwise edge parallel to a second direction and the third direction, respectively. The second transceiving circuit is disposed on the second radiation slice. The second transceiving circuit receives at least a second internal transmission signal at the second polarization from a first end of the second lengthwise edge, performing second transmitting-transformation of the at least a second internal transmission signal to generate the at least a second external transmission signal, and feeds the at least a second external transmission signal to a second end of the second lengthwise edge. The first polarization and the second polarization are orthogonal to each other. The first direction, the second direction and the third direction are orthogonal to each other.

According to a second embodiment of the present invention, a receiver is provided for receiving at least a first external reception signal at first polarization and receiving at least a second external reception signal at second polarization. The receiver includes: a plurality of first transceiving units and a plurality of second transceiving units. Each of the first transceiving units includes: a first radiation slice and a first transceiving circuit. The first radiation slice has a first widthwise edge and a first lengthwise edge parallel to a first direction and a third direction, respectively. The first transceiving circuit is disposed on the first radiation slice. The first transceiving circuit receives the at least a first external reception signal from a second end of the first lengthwise edge, performing first-receiving transformation of the at least a first external reception signal to generate at least a first internal reception signal at the first polarization, and feeds the at least a first internal reception signal into a first end of the first lengthwise edge. Each of the second transceiving units includes: a second radiation slice and a second transceiving circuit. The second radiation slice has a second widthwise edge and a second lengthwise edge parallel to a second direction and the third direction, respectively. The second transceiving circuit is disposed on the second radiation slice. The second transceiving circuit receives the at least a second external reception signal from a second end of the second lengthwise edge, performing second receiving-transformation of the at least a second external reception signal to generate at least a second internal reception signal at the second polarization, and feeds the at least a second internal reception signal into a first end of the second lengthwise edge. The first polarization and the second polarization are orthogonal to each other. The first direction, the second direction and the third direction are orthogonal to each other.

To better understand the aforementioned aspect and other aspects of the present invention, preferred embodiments are provided by the following detailed description and accompanying drawings, in which:

DRAWINGS

FIG. 24A is a schematic diagram illustrating that the transceiver unit array is only disposed in a first communication device.

FIG. 24B is a schematic diagram illustrating that the transceiver unit array is only disposed in a second communication device.

FIG. 24C is a schematic diagram illustrating that the transceiver unit arrays are disposed in both the first communication device and the second communication device.

DETAILED DESCRIPTION

On condition that transmission quality of the wireless transmission signal is maintained, the present disclosure takes advantage of multiple transceiving units with low gain and wideband property to both lower power of the radiating antenna and simplify the wiring. The present disclosure takes advantage of multiple transceiving units with low gain and wideband property. The transceiving unit of the present disclosure uses a radiation slice as an antenna for receiving wireless communication signals or transmitting wireless communication signals to decrease the quantity of signal lines connected to the radio frequency and base band circuit. The present disclosure can ensure certain coverage of the field of view of the entire antenna array system and minimize the space among the radiation slices (for example, shorter than half-wave length). The transceiver provided by the present disclosure can generate sufficient equivalent isotropically radiated power (EIRP) to perform long-distance communication.

To simplify the wiring, the radio frequency and base band circuit of the present disclosure works with a feeding antenna to transmit the internal transmission signal Sint_tr to a transceiving unit array in a wireless manner. To lower the power consumption of the radiating antenna, the present disclosure utilizes the transceiving unit array including a plurality of transceiving units to radiate the external transmission signal Sext_tr into air. Furthermore, the transceiving unit array of the present disclosure includes transceiving units arranged in two directions. The transceiving units arranged in two directions are used for radiately transmitting and/or radiately receiving horizontally-polarized wireless communication signals and vertically-polarized wireless communication signals, respectively. By the way, the mentioned radiately transmitting and radiately receiving mean transmitting and receiving the wireless communication signals via an antenna. Furthermore, the transceiving units of the present disclosure have functions of phase shift and gain adjustment to adjust the wavefront of the external transmission and/or reception signals. For illustration purposes only, the transceiver is mainly functioned as a transmitter in the following description, but the transceiver may be functioned as a receiver.

Figure 1A:
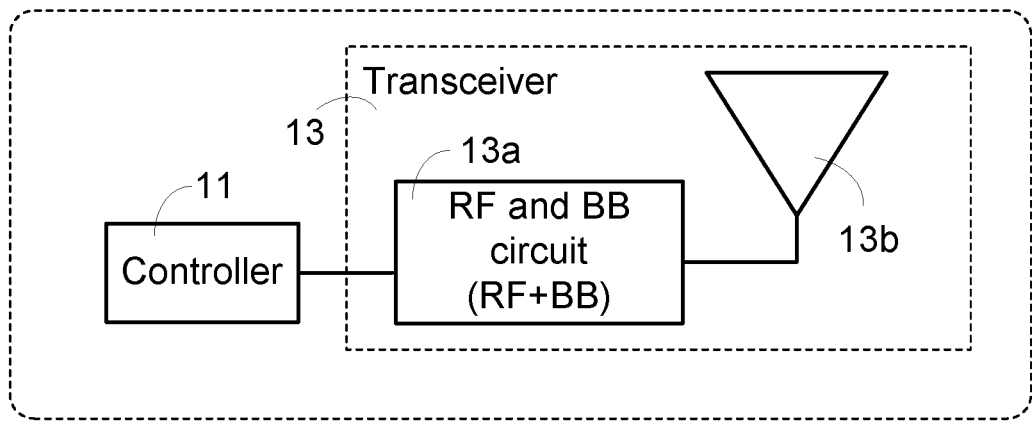
FIG. 1A (prior art) is a schematic diagram illustrating a transceiver which transmits wireless communication signals in a low-frequency band and utilizes a high gain antenna.
Figure 1B:
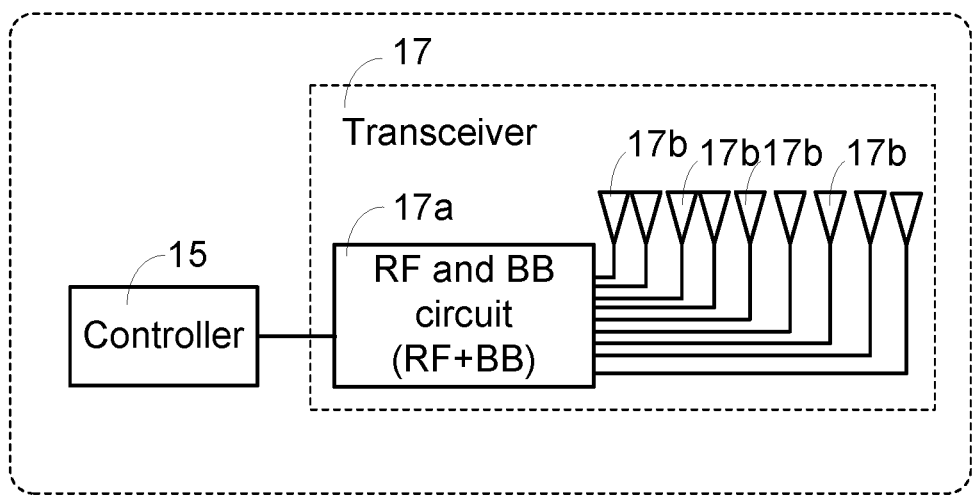
FIG. 1B (prior art) is a schematic diagram illustrating a transceiver utilizing multiple antennas with lower transmit power.
Figure 2:
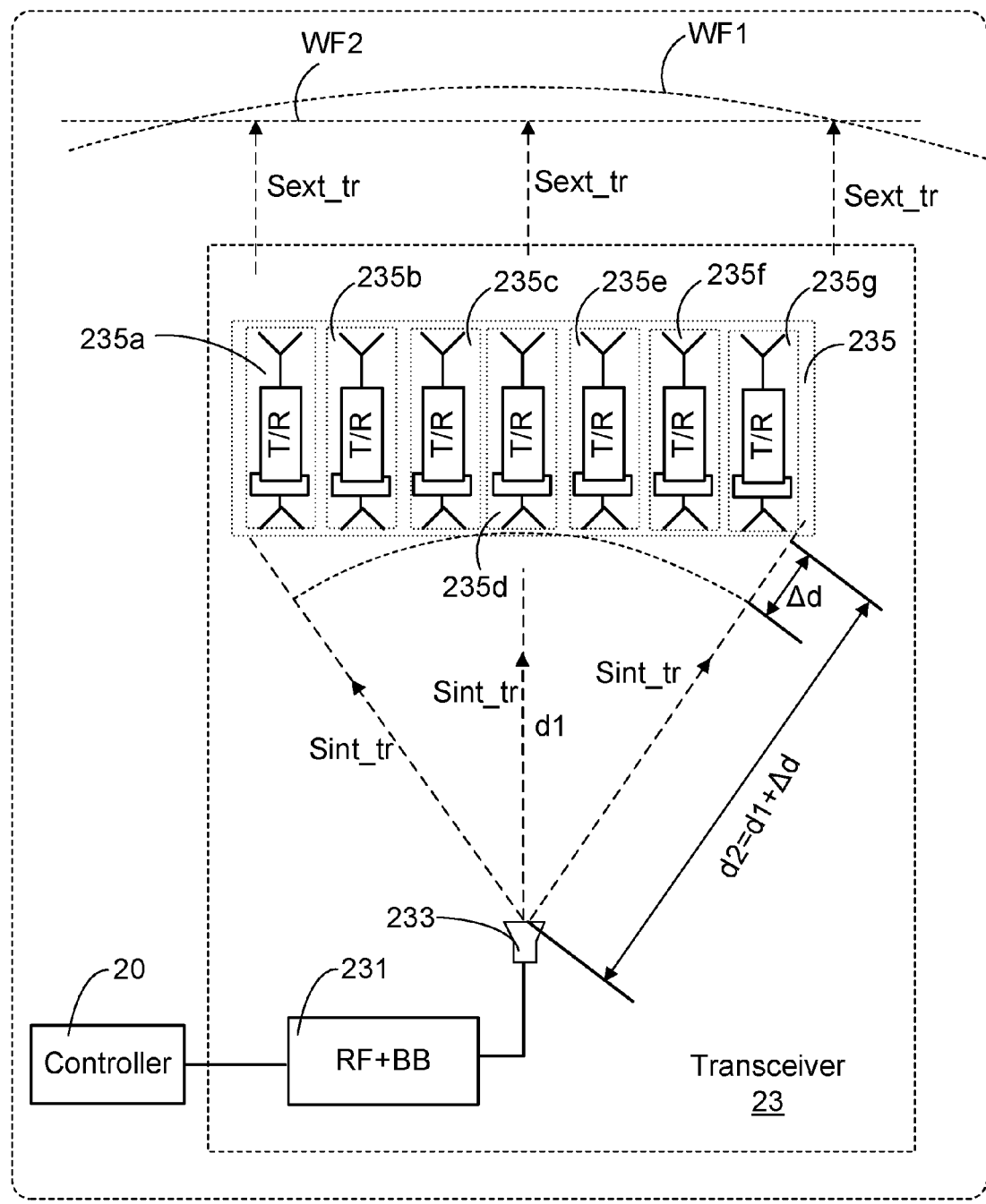
FIG. 2 is a schematic diagram illustrating that a radio frequency and base band circuit generates a spherical wave to transceiving units when a controller controls a transceiver to transmit a wireless communication signal.

Please refer to FIG. 2, a schematic diagram illustrating that a radio frequency and base band circuit generates a spherical wave to transceiving units when a controller controls a transceiver to transmit a wireless communication signal. In this diagram, the transceiver 23 includes a radio frequency and base band circuit 231, a feeding antenna 233 and a transceiving unit array 235. The feeding antenna 233 may be an individual antenna or an antenna array. The transceiving unit array 235 further includes a plurality of transceiving units 235a~235g. The transceiving units 235a~235g are disposed on the same plane. In a side view, the transceiving units 235a~235g are horizontally aligned.

The controller 20 controls the radio frequency and base band circuit 231 and the feeding antenna 233 to radiately transmit the internal transmission signal Sint_tr to the transceiving unit array 235. Then, the transceiving unit array 235 transforms the internal transmission signal Sint_tr into external transmission signal Sext_tr, and radiately transmits the external transmission signal Sext_tr out from the transceiver 23. However, because the relative distances between the feeding antenna 233 and the transceiving units 235a~235g are not identical, the time points when the transceiving units 235a~235g actually receive the internal transmission signal Sint_tr are not exactly identical. For example, the relative distance d1 between the feeding antenna 233 and the transceiving unit 235d is shorter than the relative distance d2 between the feeding antenna 233 and the transceiving unit 235g. There is a difference $\Delta d$ between the relative distance d1 and the relative distance d2 (that is, $d2=d1+\Delta d$).

In other words, when the internal transmission signal Sint_tr is radiately transmitted from the feeding antenna 233 to the transceiving unit 235g, the internal transmission signal Sint_tr should travel an additional distance $\Delta d$. If the transceiving units 235a~235g transform the internal transmission signal Sint_tr into the external transmission signal Sext_tr immediately after the time points when respective transceiving units 235a~235g receive the internal transmission signal Sint_tr, the transceiving unit 235d at the center of the transceiving unit array 235 receives the internal transmission signal Sint_tr, transforms the internal transmission signal Sint_tr and transmits the external transmission signal Sext_tr earlier. Hence, the wavefront of the external transmission signal Sext_tr from the transceiver 23 has a spherical surface (spherical wavefront WF1). In this way, the time points when a remote transceiver receives the external transmission signal Sext_tr are different.

To prevent the differences in the time points when the internal transmission signal Sint_tr reach the transceiving units during the wireless transmission between the feeding antenna 233 and the transceiving units 235a~235g due to different relative distances between the feeding antenna 233 and the transceiving units 235a~235g, even affecting the time points of generating and transmitting the external transmission signal Sext_tr, the transceiving units 235a~235g of the present disclosure are controlled by the controller 20 to adjust the internal transmission signal Sint_tr according to the respective relative positions of the transceiving units 235a~235g in the transceiving unit array 235 after the transceiving unit array 235 receives the internal transmission signal Sint_tr. In other words, after the transceiving units 235a~235g receive the internal transmission signal Sint_tr, the internal transmission signal Sint_tr is adaptively transformed (for example, phase shift or gain adjustment) to make the wavefront of the output external transmission signal Sext_tr to be a plane wavefront WF2.

Figure 3:
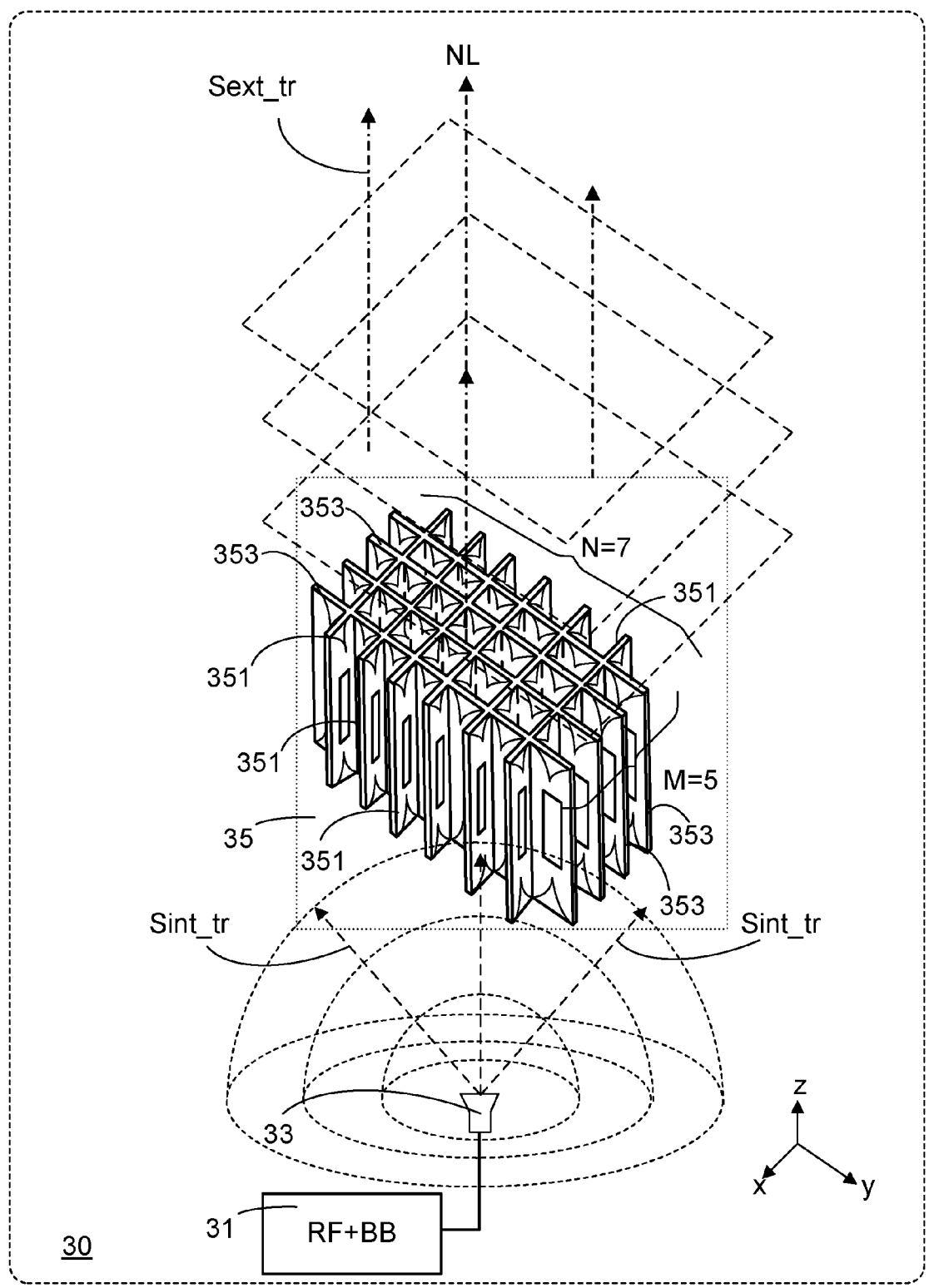
FIG. 3 is a schematic diagram three-dimensionally illustrating that the external transmission signal is transmitted in the form of a plane wave after transformation performed by the transceiver.

Please refer to FIG. 3, a schematic diagram three-dimensionally illustrating that the external transmission signal is transmitted in the form of a plane wave after transformation performed by the transceiver. The transceiver 30 includes the radio frequency and base band circuit 31, the feeding antenna 33 and the transceiving unit array 35. Waves in the millimeter band have extremely short wavelengths. Therefore, intervals between the transceiving units 351, 353 of the transceiving unit array 35 are very narrow, and limited space is available for signal lines. To avoid interference between the signal lines and unnecessary power consumption which decreases the overall efficiency, the transceiving units 351, 353 are in communication with the radio frequency and base band circuit 31 via wireless communication signals. Hence, the complexity of the wiring from the radio frequency and base band circuit 31 to the transceiving unit array 35 does not exist. In the transceiver 30, the internal transmission signal Sint_tr is radiately transmitted from the feeding antenna 33. After passing the transceiving unit array 35, the internal transmission signal Sint_tr is transformed into the external transmission signal Sext_tr in the form of a plane wave. Then the transceiving unit array 35 transmits the external transmission signal Sext_tr out from the transceiver 30. In FIG. 3, it is assumed that the normal direction NL is parallel to the z-axis.

When the transceiver 30 is used for transmission, the transceiving units 351, 353 receive the internal transmission signal Sint_tr radiately transmitted from the feeding antenna 33, transform the internal transmission signal Sint_tr into the external transmission signal Sext_tr, and radiate the external transmission signal Sext_tr into air after the transformation. When the transceiver 30 is used for reception, the transceiving units 351, 353 receive external reception signals Sext_rv from the air, transform the external reception signals Sext_rv into internal reception signals Sint_rv, and radiately transmitted the internal reception signals Sint_rv to the feeding antenna 33 after the transformation.

The transceiving unit array of the present application can split and combine spatial power. The transceiving units 351, 353 of the transceiving unit array 35 are arranged in a grid structure. For illustration purposes, it is assumed that the column direction and the row direction of the grid structure are orthogonal to each other wherein the row direction is parallel to the x-axis and the column direction is parallel to the y-axis. Because the transceiving units 351, 353 are arranged in different directions such as the column direction and the row direction in the grid structure, the transceiving units 351, 353 are used for transforming the external transmission signal Sext_tr at orthogonal dual-polarization, respectively. For example, when the transceiving units 351 extending along the row direction are used for transmitting horizontally-polarized (H-Pol) external transmission signal Sext_tr, the transceiving units 353 extending along the column direction are used for transmitting vertically-polarized (V-Pol) external transmission signal Sext_tr, and vice versa.

From FIG. 3, because of the huge quantity of the transceiving units, the overall surface area of the grid structure increases so as to effectively disperse the heat from the transceiving circuits. Therefore, heat dissipation is achieved because the heat is not aggregated in a small region of the transceiving unit array 35. For illustration purposes, it is assumed that the grid structure consisting of the transceiving units 351, 353 includes M columns×N rows of cells. The transceiving unit array 35 in FIG. 3, for example, includes 5 columns×7 rows of cells in the grid structure, that is, M=5 and N=7. The transceiving unit array 35 further includes two subunit arrays, that is, a first subunit array and a second subunit array. In the embodiment, the first subunit array includes the transceiving units 351 parallel to the x-axis, and the second subunit array includes the transceiving units 353 parallel to the y-axis.

Figure 4B:
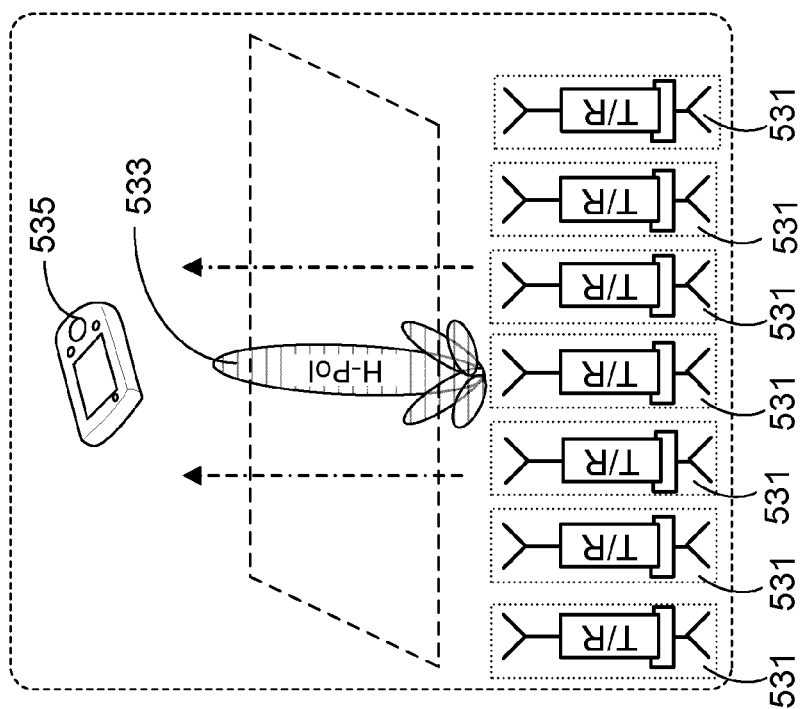
FIG. 4B is a schematic diagram illustrating a radiation power pattern when the transceiving units transmit the horizontally-polarized external transmission signal.
Figure 4A:
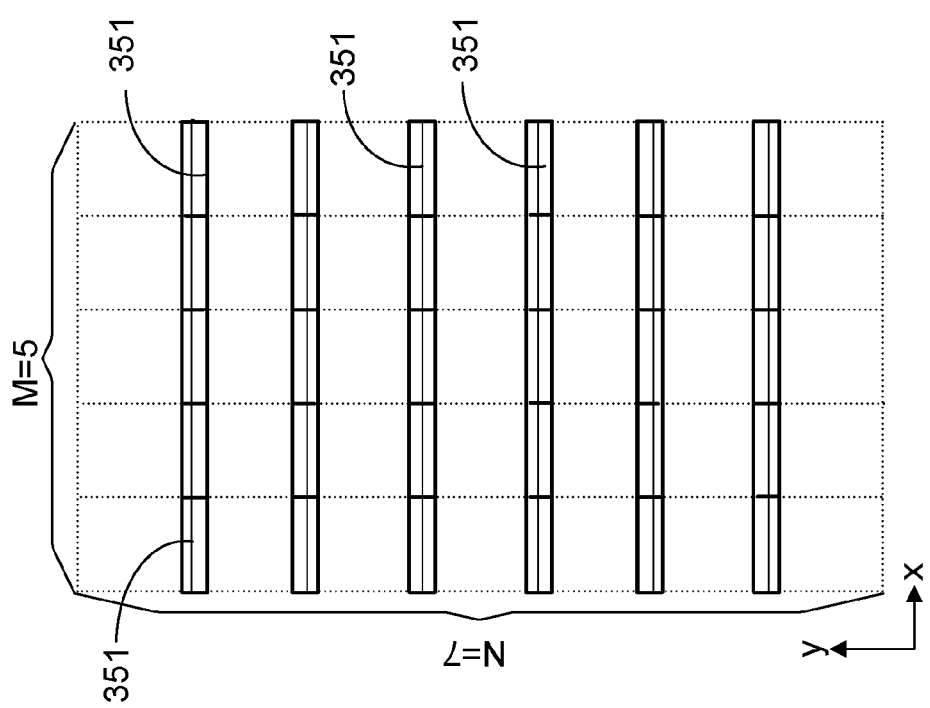
FIG. 4A is a schematic diagram illustrating the arrangement of the radiation slices whose widthwise edges are parallel to the x-axis in FIG. 3.

Please refer to FIG. 4A, a schematic diagram illustrating the arrangement of the transceiving units whose widthwise edges are parallel to the x-axis in FIG. 3. The transceiving units 351 of the first subunit array are arranged in six rows and each row includes five transceiving units 351. Therefore, the first subunit array in FIG. 3 includes thirty (5*6=30) transceiving units 351 parallel to the x-axis overall.

Please refer to FIG. 4B, a schematic diagram illustrating a radiation power pattern when the transceiving units transmit the horizontally-polarized external transmission signal. In the description, the strength of the external transmission signal Sext_tr is represented by the radiation power pattern. The lobe corresponding to the maximum radiated power is a main lobe. The lobe corresponding to the radiated power at the back side of the antenna is a back lobe. The lobes other than the main lobe and the back lobe are the side lobes.

The transceiving units 531 transmit the horizontally-polarized (H-Pol) external transmission signal 533 to a mobile phone 535. The wavefront of the horizontally-polarized (H-Pol) external transmission signal 533 is a plane wavefront. For illustration purposes, the horizontal line pattern in the drawing represents the horizontal polarization (H-Pol).

Figure 5B:
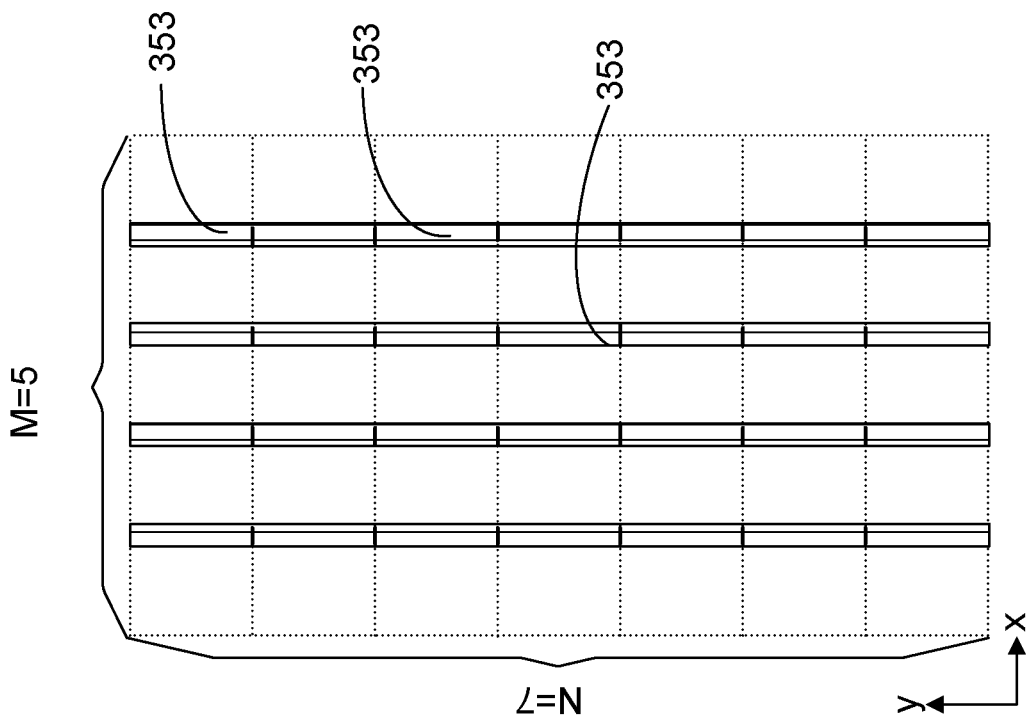
FIG. 5B is a schematic diagram illustrating a radiation power pattern when the transceiving units transmit the vertically-polarized external transmission signal.
Figure 5A:
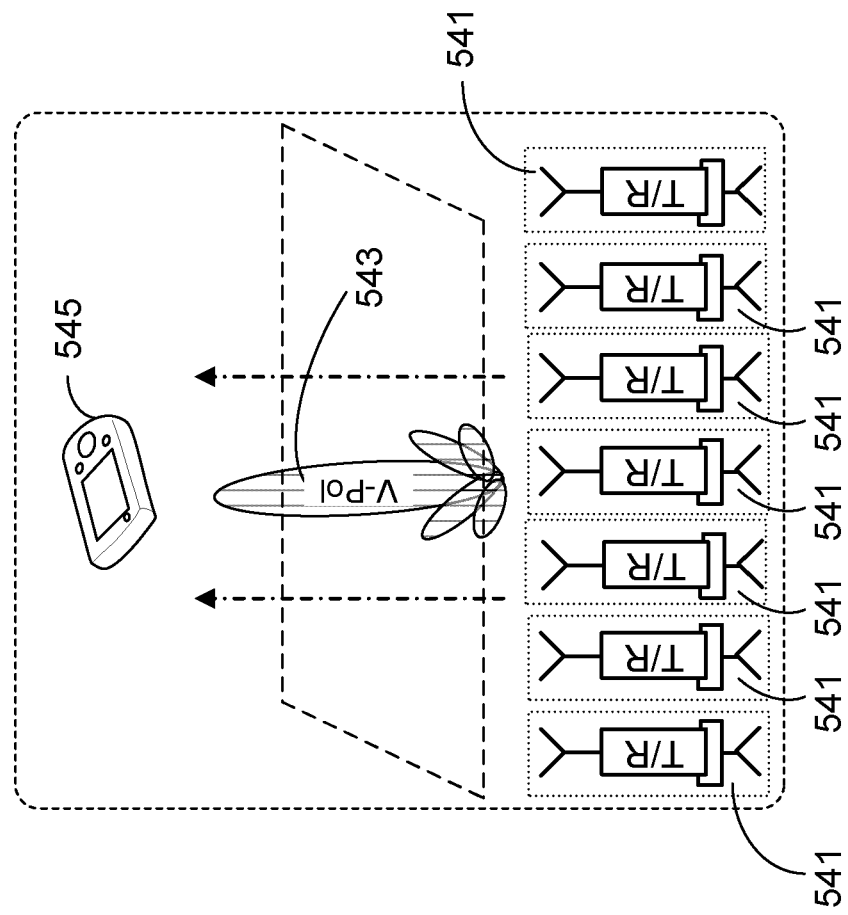
FIG. 5A is a schematic diagram illustrating the arrangement of the radiation slices whose widthwise edges are parallel to the y-axis in FIG. 3.

Please refer to FIG. 5A, a schematic diagram illustrating the arrangement of the transceiving units whose widthwise edges are parallel to the y-axis in FIG. 3. In the transceiving unit array 35, the transceiving units 353 are arranged in four columns and each column includes seven transceiving units 353. Therefore, the second subunit array in FIG. 3 includes twenty eight (7*4=28) transceiving units 353 parallel to the y-axis overall.

Please refer to FIG. 5B, a schematic diagram illustrating a radiation power pattern when the transceiving units transmit the vertically-polarized external transmission signal. The transceiving units 541 transmit the vertically-polarized (V-Pol) external transmission signal 543 to the mobile phone 545. The wavefront of the vertically-polarized (V-Pol) external transmission signal 543 is a plane wavefront. For illustration purposes, the vertical line pattern in the drawing represents the vertical polarization (V-Pol).

Figure 6A:
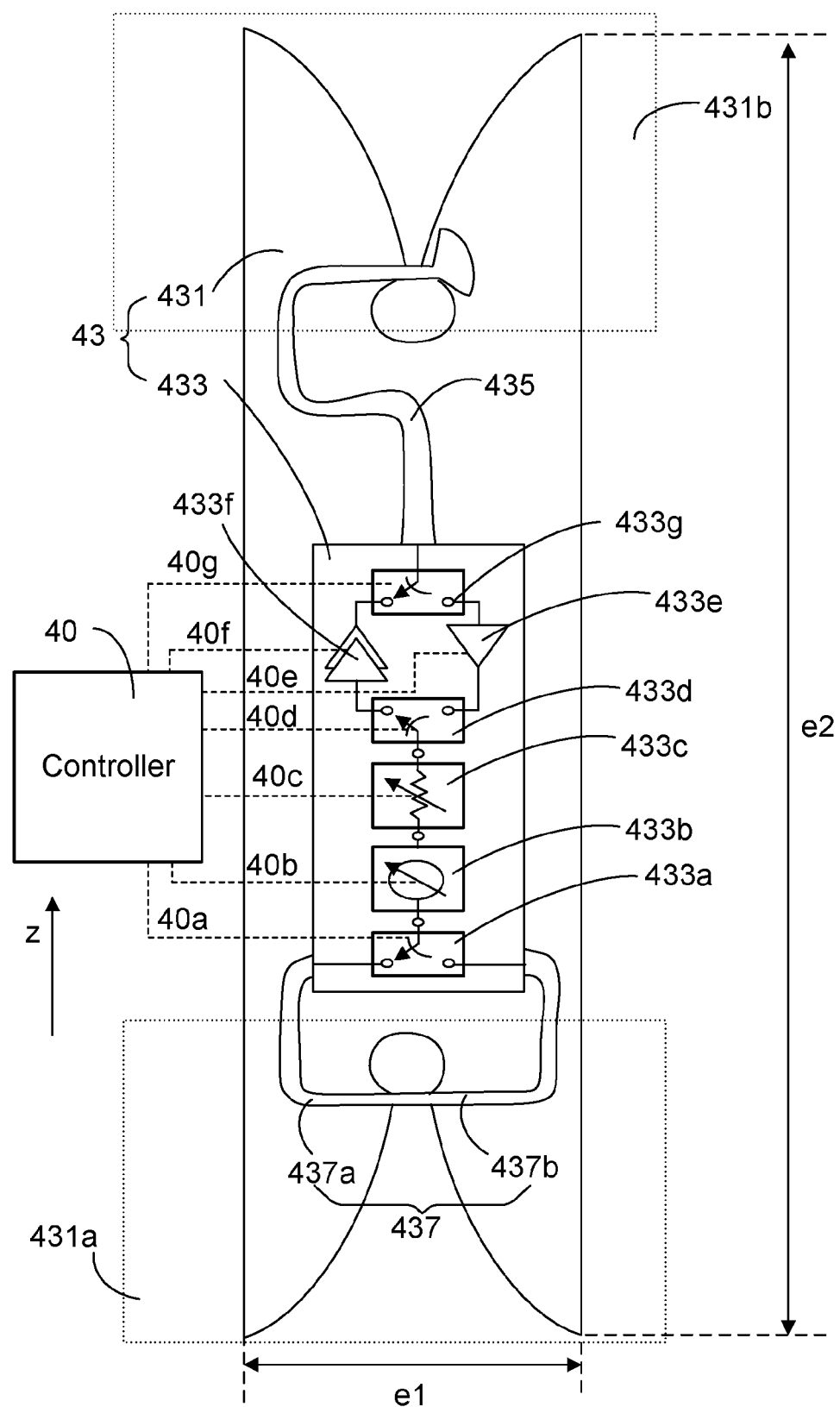
FIG. 6A is a schematic diagram illustrating a transceiving unit.
Figure 6B:
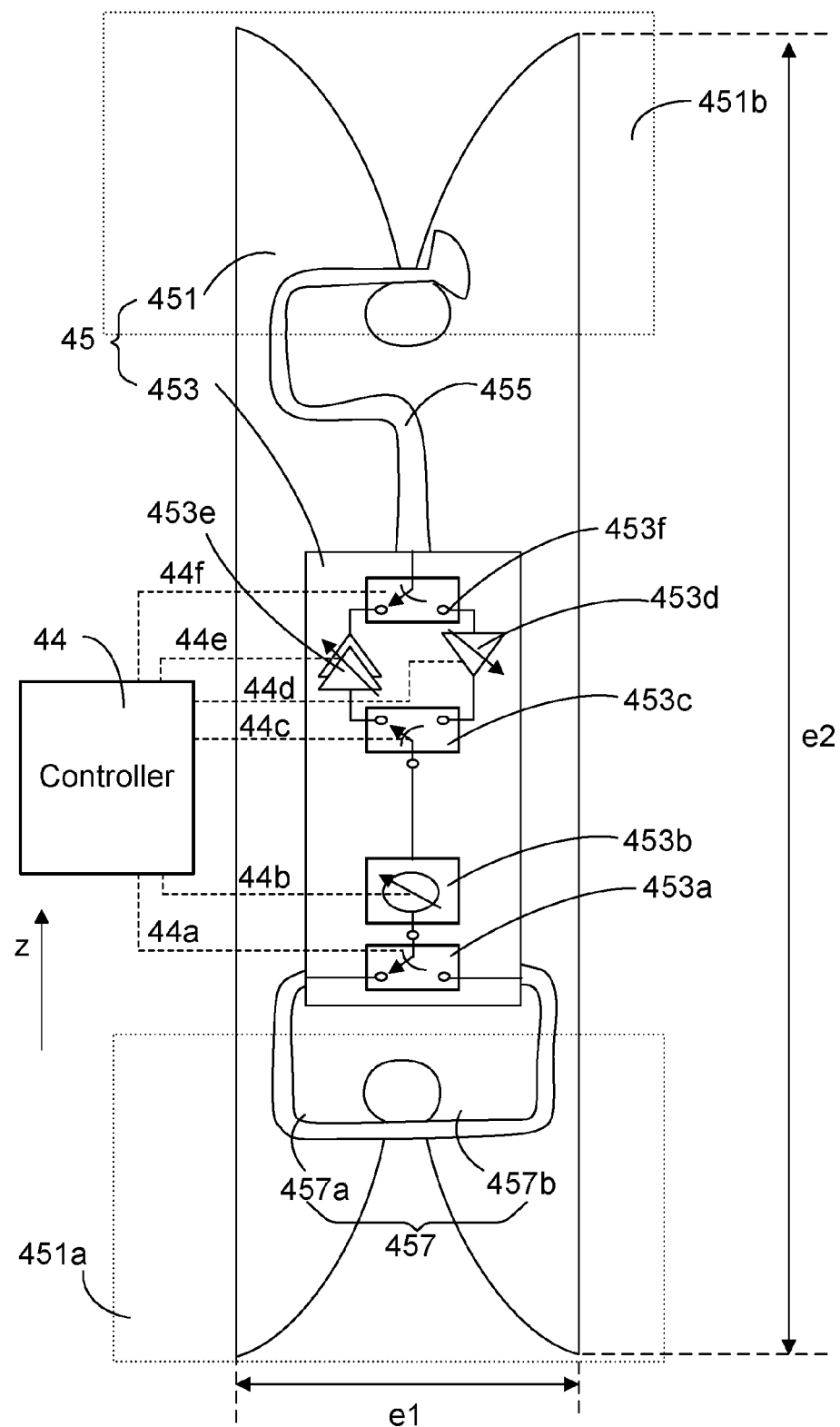
FIG. 6B is a schematic diagram illustrating another transceiving unit.

FIG. 6A and FIG. 6B illustrate embodiments of the transceiving units according to the present disclosure. According to the concept of the present disclosure, each transceiving unit 43, 45 includes an approximately rectangular radiation slice 431, 451 and a transceiving circuit 433, 453 disposed on the radiation slice 431, 451.

The radiation slice 431, 451 is made of a conductive material and has a lengthwise edge e2 and a widthwise edge e1. The lengthwise edge e2 is parallel to the z-axis. The widthwise edge e1 is parallel to the x-axis or the y-axis according the position of the transceiving unit 43, 45 in the transceiving unit array. If the transceiving unit 43, 45 belongs to the first subunit array, its radiation slice 431, 451 is parallel to the x-axis. If the transceiving unit 43, 45 belongs to the second subunit array, its radiation slice 431, 451 is parallel to the y-axis.

Hereinafter, one end of the lengthwise edge e2 of the radiation slice 431, 451 toward the feeding antenna (at the bottom of FIG. 6A and FIG. 6B) is defined as a first end 431a, 451a. The other end of the radiation slice 431, 451 toward the outside of the communication device (at the top of FIG. 6A and FIG. 6B) is defined as a second end 431b, 451b. Therefore, a relative distance between the first end 431a, 451a of the lengthwise edge e2 of the radiation slice 431, 451 and the feeding antenna is shorter than a relative distance between the second end 431b, 451b of the lengthwise edge e2 of the radiation slice 431, 451 and the feeding antenna. On the other hand, a relative distance between the first end 431a, 451a of the lengthwise edge e2 of the radiation slice 431, 451 and an external reception device is longer than a relative distance between the second end 431b, 451b of the lengthwise edge e2 of the radiation slice 431, 451 and the external reception device. Tapered slot antenna structure with wideband property is formed at both ends of the lengthwise edge e2 of the radiation slice 431, 451. The operating frequency ranges from 26 GHz to 42 GHz. The transceiving circuit 433, 453 disposed on the radiation slice 431, 451 can perform receiving-transformation of the external reception signal Sext_rv to generate the internal reception signal Sint_rv, or perform transmitting-transformation of the internal transmission signal Sint_tr to generate the external transmission signal Sext_tr.

When the transceiving unit 43, 45 is used for transmitting the external transmission signal Sext_tr, the first end 431a, 451a of the radiation slice 431, 451 receives the internal transmission signal Sint_tr from the feeding antenna, and transmits the internal transmission signal Sint_tr to the transceiving circuit 433, 453 for the transmitting-transformation. The transceiving circuit 433, 453 transmitting-transforms the internal transmission signal Sint_tr into the external transmission signal Sext_tr. Then, the second end 431b, 451b of the radiation slice 431, 451 receives the external transmission signal Sext_tr from the transceiving circuit 433, 453 and radiately transmits the external transmission signal Sext_tr into air.

When the transceiving unit 43, 45 is used for receiving the external reception signal Sext_rv, the second end 431b, 451b of the radiation slice 431, 451 receives the external reception signal Sext_rv from air, and transmits the external reception signal Sint_rv to the transceiving circuit 433, 453 for the receiving-transformation. The transceiving circuit 433, 453 transforms the external reception signal Sext_rv into the internal reception signal Sint_rv. Then, the first end 431a, 451a of the radiation slice 431, 451 receives the internal reception signal Sint_rv from the transceiving circuit 433, 453 and radiately transmits the internal reception signal Sint_rv to the feeding antenna.

Please refer to FIG. 6A, a schematic diagram illustrating a transceiving unit. The transceiving circuit 433 includes an internal feeding path 437, an external feeding path 435, a phase switch 433a, a phase shifter 433b, an attenuator 433c, functional switches 433d, 433g, a transmitting amplifier 433f and a low noise amplifier 433e. The functional switches 433d, 433g will conduct one of the transmitting amplifier 433f and the low noise amplifier 433e according to the function (transmitting or receiving) of the transceiving unit. In FIG. 6A, the controller 40 sends control signals 40a~40g to the transceiving circuit 433.

The internal feeding path 437 further includes a first phase feeding path 437a and a second phase feeding path 437b. The first phase feeding path 437a and the second phase feeding path 437b receive the reception signals from the first end of the lengthwise edge e2 of the radiation slice 431 simultaneously. Since the first phase feeding path 437a and the second phase feeding path 437b have opposite feeding directions, the physical characteristics results in a phase difference of 180° between signals passing through the first phase feeding path 437a and the second phase feeding path 437b. By switching the phase switch 433a, the phase shifter 433b selects one of the phase feeding paths as a signal source. Therefore, the phase shifter 433b may introduce a phase delay to the transmission signal and/or reception signal by slightly adjusting its phase delay.

For example, if the transceiving circuit 433 should introduce a phase delay of 30° to the internal transmission signal, the phase shifter 433b selects the first phase feeding path 437a to receive the signal, and the phase shifter 433b provides a phase delay of 30°. If the transceiving circuit 433 should introduce a phase delay of 210° to the internal transmission signal, the phase shifter 433b selects the second phase feeding path 437b to receive the signal, and the phase shifter 433b also provides a phase delay of 30°. The structure provides two opposite signals (phase difference of 180°) due to the shape design can significantly reduce consumption of the phase shifter 433b and reduce phase-shifting error. Compared to the common phase shifter, the physical characteristics due to the phase difference of 180° between the first phase feeding path 437a and the second phase feeding path 437b does not vary with the frequency. Therefore, the feeding path designed based on physical structure is suitable for wideband application and can reduce the complexity and consumption of the phase shifter 433b.

The attenuator 433c is used with the transmitting amplifier 433f and the low noise amplifier 433e to adjust the gain of the transmitting amplifier 433f and the low noise amplifier 433e so as to compensate the consumption due to defective pattern of the feeding antenna and inhibit the side lobes. The phase shifter 433b is used for phase control to compensate the phase difference due to path difference and adjust the phase for beamforming.

When the transceiving circuit 433 is used for transmission, the functional switches 433d, 433g conduct connection between the external feeding path 435 and the transmitting amplifier 433f and the attenuator 433c. When the transceiving circuit 433 is used for reception, the transceiving circuit 433 stops the use of the transmitting amplifier 433f. At this time, the functional switches 433d, 433g conduct connection between the external feeding path 435 and the no noise amplifier 433f and the attenuator 433c.

Please refer to FIG. 6B, a schematic diagram illustrating another transceiving unit. The transceiving circuit 453 includes an internal feeding path 457, an external feeding path 455, a phase switch 453a, a phase shifter 453b, functional switches 453c, 453f, a transmitting amplifier 453e and a low noise amplifier 453d. The internal feeding path 457 further includes a first phase feeding path 457a and a second phase feeding path 457b. The functional switches 453c, 453f will conduct one of the transmitting amplifier 453e and the low noise amplifier 453d according to the function (transmitting or receiving) of the transceiving unit. In FIG. 6B, the controller 44 sends control signals 44a~44f to the transceiving circuit 453.

In FIG. 6A, the gains of the transmitting amplifier 433f and the low noise amplifier 433e are adjusted quantitatively so that the attenuator 433c is required. On the other hand, the gains of the transmitting amplifier 453e and the low noise amplifier 453d in FIG. 6B can be adjusted in a more flexible manner so that the transceiving circuit 453 does not include an attenuator.

Figure 6C:
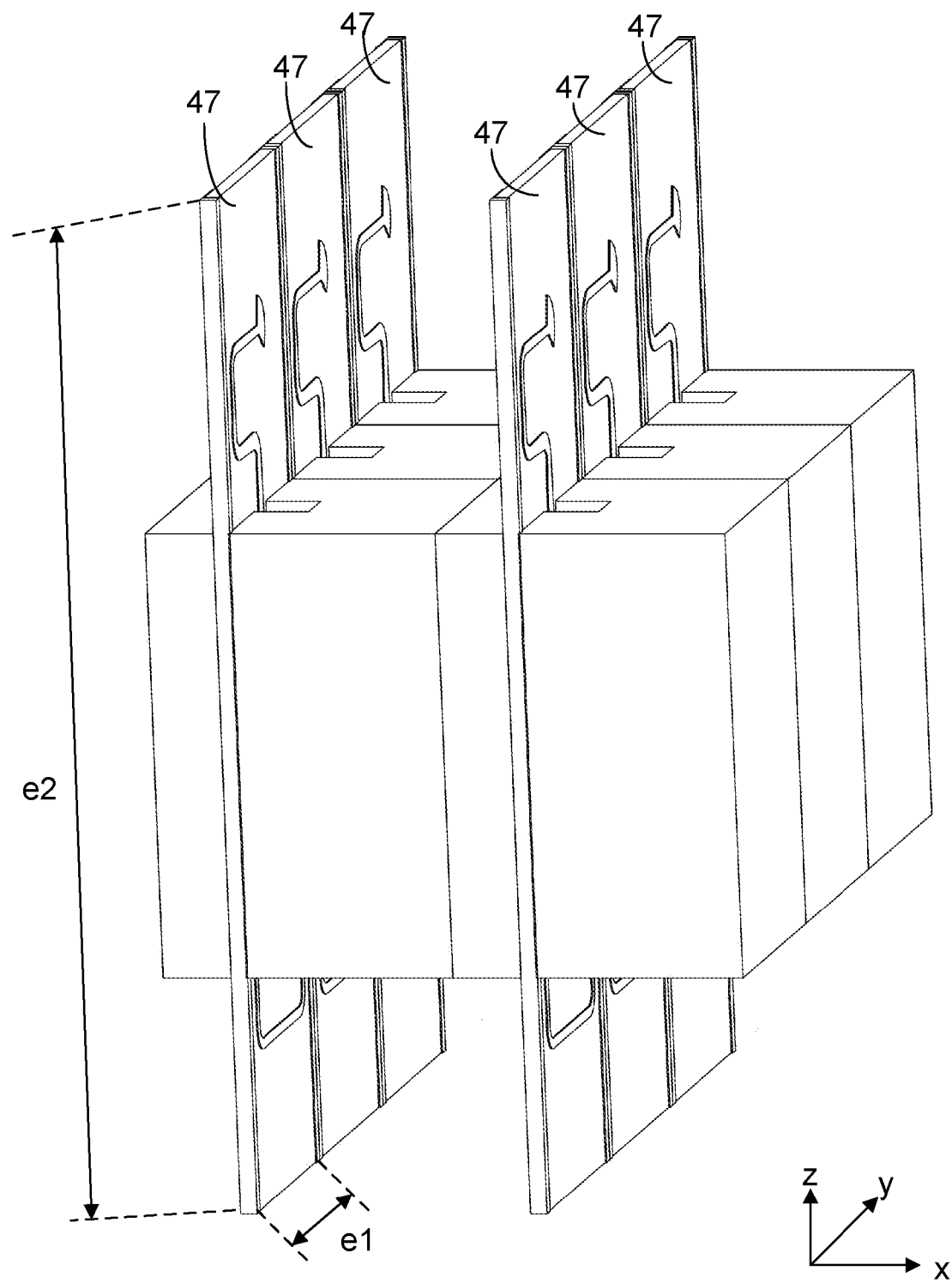
FIG. 6C is a schematic diagram illustrating the transceiving circuits of a transceiving unit array arranged along the y-axis.

Please refer to FIG. 6C, a schematic diagram illustrating the transceiving circuits of a transceiving unit array arranged along the y-axis. In this drawing, the widthwise edges of the radiation slices 47 are parallel to the y-axis in this example to describe the arrangement of the transceiving units. According to FIG. 6C, the radiation slices 47 are thin enough to dispose the transceiving circuits between every two adjacent parallel radiation slices 47.

Referring back to the embodiment with reference to FIG. 3, it is assumed that the transceiving units are arranged in the grid structure of M=5 and N=7. In FIG. 7A, the transceiving units are arranged in an open array.

Figure 7B:
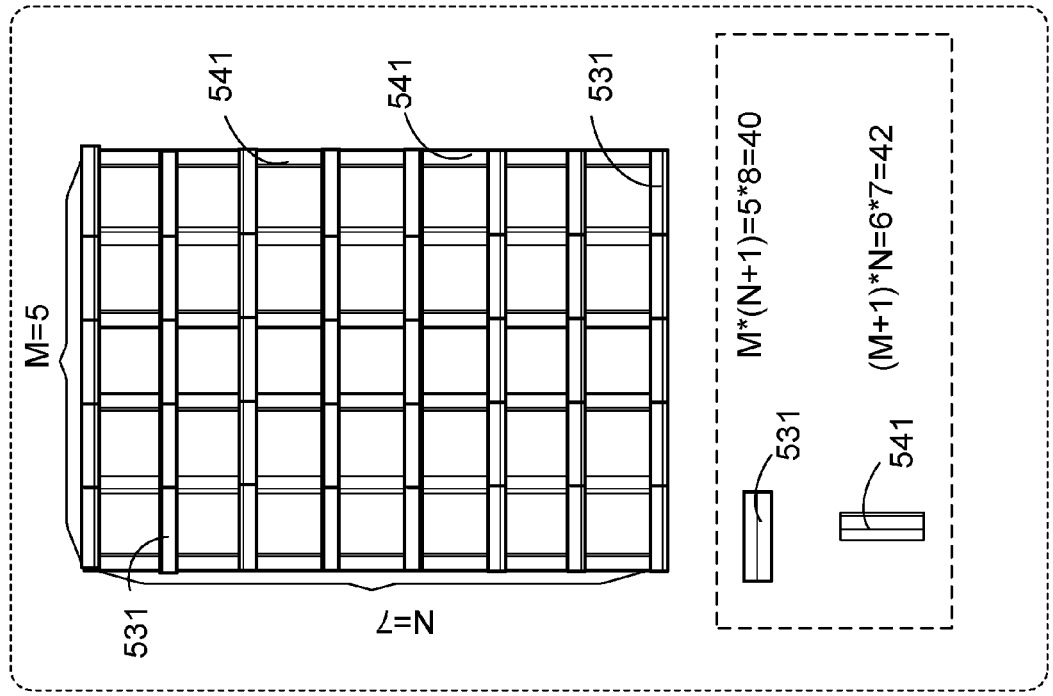
FIG. 7B is a top view illustrating the transceiving units arranged as a closed array.
Figure 7A:
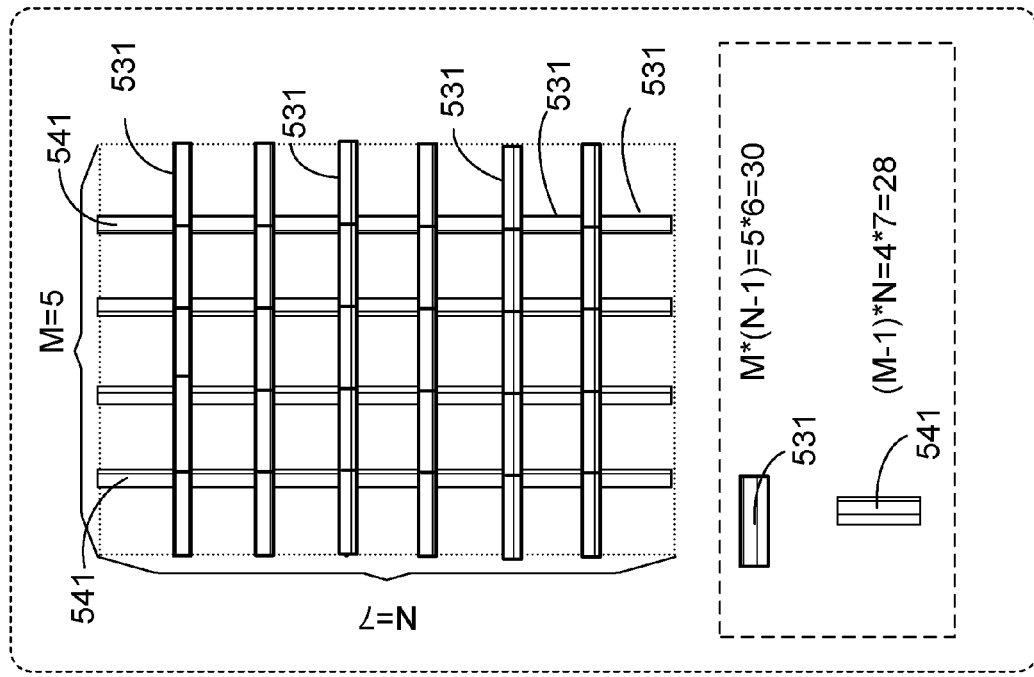
FIG. 7A is a top view illustrating the transceiving units arranged as an open array.

In FIG. 7B, the transceiving units are arranged in a closed array. In practice, it is not intended to limit exterior appearance, size, or open or closed design of the transceiving unit array. In FIG. 7A and FIG. 7B, the horizontal line pattern indicates the transceiving units 531 parallel to the x-axis, and the vertical line pattern indicates the transceiving units 541 parallel to the y-axis.

Please refer to FIG. 7A, a top view illustrating the transceiving units arranged as an open array. In FIG. 7A, the first subunit array includes 5*6=30 transceiving units 531 parallel to the x-axis; the second subunit array includes 4*7=28 transceiving units 541 parallel to the y-axis. That is to say, if the transceiving units 531, 541 are arranged as the open array, there are M*(N−1) transceiving units 531 parallel to the x-axis, and there are (M−1)*N transceiving units 541 parallel to the y-axis.

Please refer to FIG. 7B, a top view illustrating the transceiving units arranged as a closed array. In FIG. 7B, the first subunit array includes 5*8=40 transceiving units 531 parallel to the x-axis; the second subunit array includes 6*7=42 transceiving units 541 parallel to the y-axis. That is to say, if the transceiving units 531, 541 are arranged as the closed array, there are M*(N+1) transceiving units 531 parallel to the x-axis, and there are (M+1)*N transceiving units 541 parallel to the y-axis.

Figure 8:
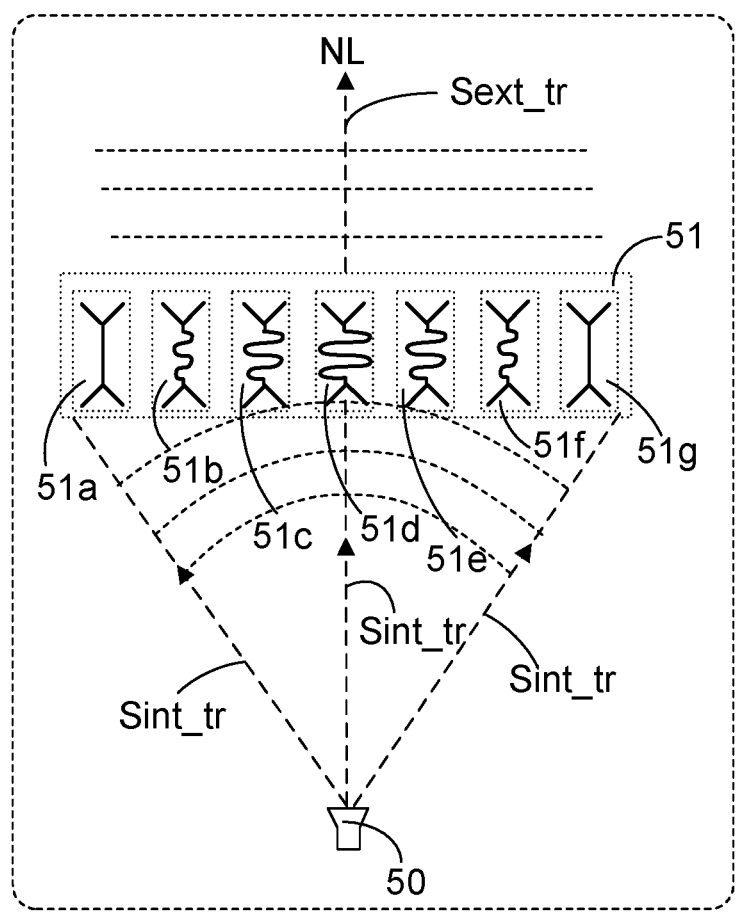
FIG. 8 is a schematic diagram illustrating that transmission paths of the internal transmission signal in the transceiving units are adjusted to generate the external transmission signal with plane wavefront to be transmitted out from the transceiving unit array.

Please refer to FIG. 8, a schematic diagram illustrating that transmission paths of the internal transmission signal in the transceiving units are adjusted to generate the external transmission signal with plane wavefront to be transmitted out from the transceiving unit array. According to the present disclosure, after the feeding antenna 50 transmits the internal transmission signal Sint_tr to the transceiving unit array 51, the transceiving units 51a~51g adjust the transmission paths of the corresponding received internal transmission signal Sint_tr. As mentioned above, each transceiving unit 51a~51g has its own radiation slice and transceiving circuit.

For example, the transceiving units 51a, 51g at the edges receive the internal transmission signal Sint_tr at a later time point. Therefore, after the first ends of the radiation slices of the transceiving units 51a, 51g toward the feeding antenna receive the internal transmission signal Sint_tr, the internal transmission signal Sint_tr are transmitted to the other end of the radiation slice toward the outside immediately. On the other hand, the transceiving unit 51d at the center receives the internal transmission signal Sint_tr at the earliest time point and should wait until other transceiving units 51a, 51b, 51c, 51e, 51f, 51g have received the internal transmission signal Sint_tr. Therefore, after the transceiving unit 51d receives the internal transmission signal Sint_tr, a longer curved path is provided to retard the transmission time for transmitting the internal transmission signal Sint_tr to the other end of the radiation slice. Similarly, the retardation of the internal transmission signal Sint_tr transmitted by the transceiving units 51c, 51e near the center is greater than the retardation of the internal transmission signal Sint_tr transmitted by the transceiving units 51b, 51f near the edges.

Hence, the external transmission signal Sext_tr transmitted out from the transceiving unit array 51 has a plane wavefront. For example, the wavefront moves along the normal direction as shown in FIG. 8. The concerns of the transmission paths shown in FIG. 8 may involve the gain and the phase. That is to say, the transceiving circuit adjusts the gain and the phase of the internal transmission signal Sint_tr to change the transmission paths. The adjustment of the gain will be described with reference to FIGS. 9A, 9B, 9C and 10, and the adjustment of the phase will be described with reference to FIGS. 11 and 12.

Figure 9A:
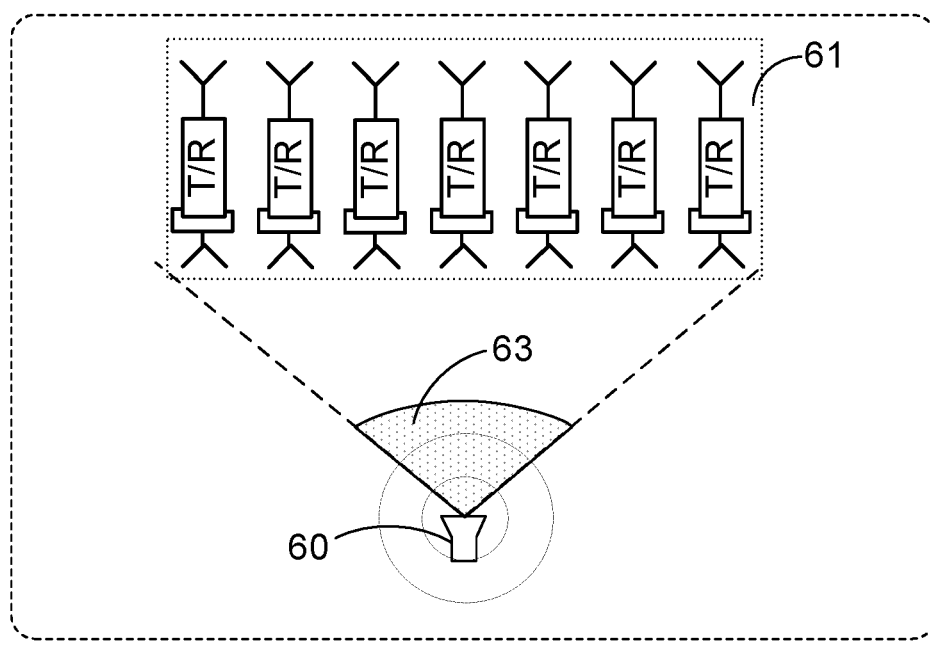
FIG. 9A is a schematic diagram illustrating ideal signal strength distribution when a feeding antenna radiates the internal transmission signal to the transceiving unit array.

Please refer to FIG. 9A, a schematic diagram illustrating ideal signal strength distribution when a feeding antenna radiates the internal transmission signal to the transceiving unit array. The ideal radiation pattern 63 of the feeding antenna 60 is a spherical sector. The central angle is the same as the angle covering the transceiving unit array 61. There is no radiation in other directions. Such ideal pattern provides the maximum efficiency. However, in a real pattern of the feeding antenna 60, the strongest appears in the normal direction and gradually weaker as away from the normal direction. Therefore, the strength of the internal transmission signal Sint_tr received from the feeding antenna 60 varies with the positions of the transceiving units.

Figure 9B:
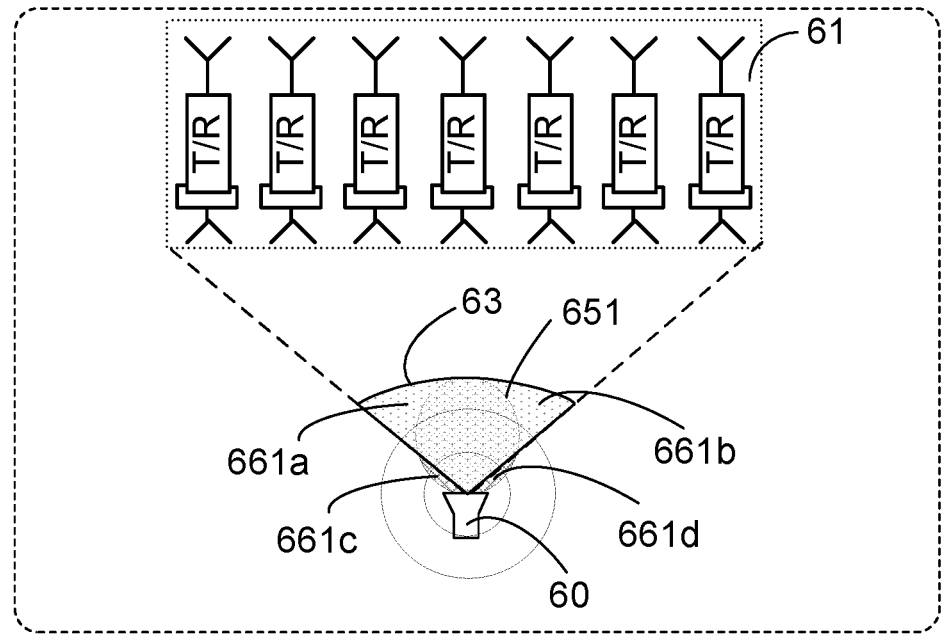
FIG. 9B is a schematic diagram illustrating real signal strength distribution narrower than the ideal signal strength distribution when the feeding antenna radiates the internal transmission signal to the transceiving unit array.

Please refer to FIG. 9B, a schematic diagram illustrating real signal strength distribution narrower than the ideal signal strength distribution when the feeding antenna radiates the internal transmission signal to the transceiving unit array. If the feeding antenna 60 generates a narrower radiation pattern 651, illumination loss 661a, 661b and spillover loss 661c, 661d occur compared to the ideal radiation pattern 63. The illumination loss occurs because the signals received at the edge of the transceiving unit array 61 are weaker. The spillover loss occurs because the signals generated by the feeding antenna do not reach the transceiving unit array 61.

Figure 9C:
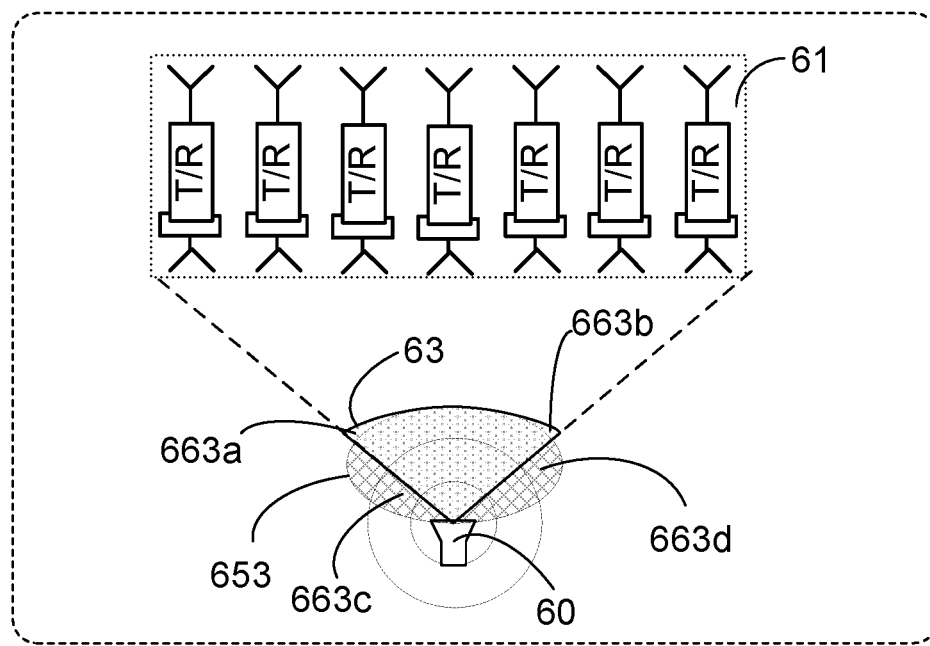
FIG. 9C is a schematic diagram illustrating real signal strength distribution wider than the ideal signal strength distribution when the feeding antenna radiates the internal transmission signal to the transceiving unit array.

Please refer to FIG. 9C, a schematic diagram illustrating real signal strength distribution wider than the ideal signal strength distribution when the feeding antenna radiates the internal transmission signal to the transceiving unit array. If the feeding antenna 60 generates a wider radiation pattern 653, illumination loss 663a, 663b and spillover loss 663c, 663d still occur compared to the ideal radiation pattern 63.

According to the description with reference to FIG. 9B and FIG. 9C, illumination loss 661a, 661b, 663a, 663b occur when the feeding antenna 60 transmits the internal transmission signal Sint_tr. In other words, the transceiving units near the edges of the transceiving unit array 61 receive weaker internal transmission signal Sint_tr from the feeding antenna 60. To increase the radiation efficiency, the controller controls the transceiving circuits in the transceiving unit array 61 to generate the external transmission signal Sext_tr with fixed signal strength. Therefore, the transceiving circuits 433, 453 in FIG. 6A and FIG. 6B include the transmitting amplifiers 433f, 453e and the attenuator 433c.

Figure 10:
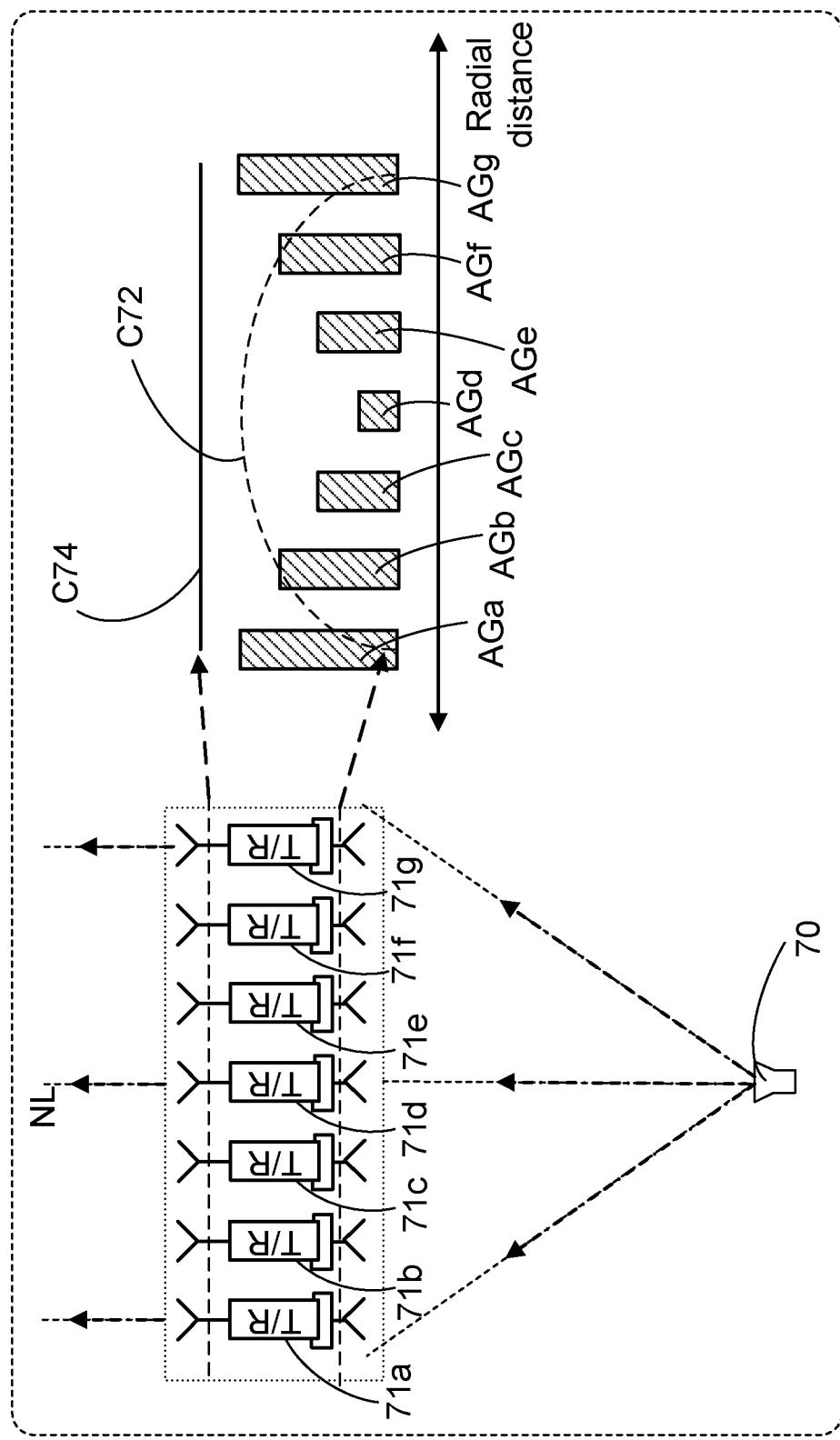
FIG. 10 is a schematic diagram illustrating that strength of the internal transmission signal are adjusted by the transceiving unit array after the feeding antenna radiately transmits the internal transmission signal to the transceiving unit array.

Please refer to FIG. 10, a schematic diagram illustrating that strength of the internal transmission signal is adjusted by the transceiving unit array after the feeding antenna radiately transmits the internal transmission signal to the transceiving unit array. It is assumed that the transceiving units 71a~71g are arranged in the same column or the same row and are used for receiving the internal transmission signal Sint_tr from the feeding antenna 70.

The internal transmission signal Sint_tr are transformed by the transceiving circuits to generate the external transmission signal Sext_tr. The present disclosure takes advantage of the transmitting amplifiers and the attenuators of the transceiving circuits in the same column or the same row to adjust the strength of the transmission signals. For example, if the curve C72 represents input power magnitude of the internal transmission signal Sint_tr, the transceiving units 71a~71g provide different amplifier gains Aga~AGg to the internal transmission signal Sint_tr. Generally speaking, considering the multiple transceiving units in the same column or the same row, the transmitting amplifier of the transceiving circuit of the transceiving unit at the center provides the lowest gain. Considering the multiple transceiving units in the same column or the same row, the transmitting amplifier of the transceiving circuit of the transceiving unit closer to the edges provides a higher gain. Furthermore, the curve C74 represents output power magnitude of the external transmission signal Sext_tr generated by the transceiving unit array.

Except for the external transmission signal Sext_tr having the plane wavefront, the gains of the transmitting amplifiers of the multiple transceiving units in the same column or the same row may be determined according to various functions. For example, by adjustment of the gain distribution, the external transmission signal Sext_tr is generated according to Chebyshev's function, Taylor's function or other function to decrease the side lobes in the radiation pattern.

Figure 11:
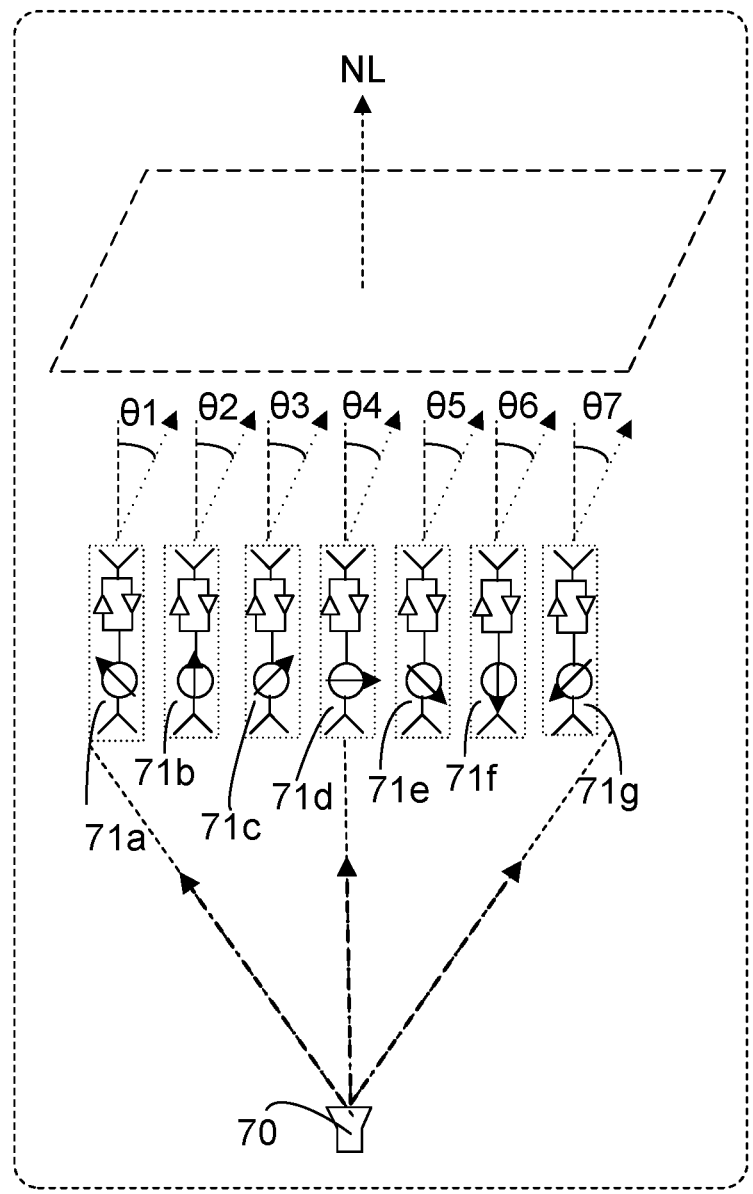
FIG. 11 is a schematic diagram illustrating respective adjustment of phase shifts introduced by the transceiving circuits of the transceiving unit array are adjusted respectively.

Please refer to FIG. 11, a schematic diagram illustrating respective adjustment of phase shifts introduced by the transceiving circuits of the transceiving unit array. According to the present disclosure, the phase shifters of the transceiving circuits can independently adjust the phase delays θ1~θ7 of the internal transmission signal Sint_tr with various degrees so that the wavefront of the external transmission signal Sext_tr radiated out from the radiation slices moves toward a consistent direction to increase the radiation efficiency. For example, the transceiving unit 71a introduces a phase delay θ1 to the internal transmission signal Sint_tr received from the feeding antenna 70; the transceiving unit 71b introduces a phase delay θ2 to the internal transmission signal Sint_tr received from the feeding antenna 70, and so on. By adjusting the external transmission signal Sext_tr to the same phase, the wavefront of the external transmission signal Sext_tr shows a plane wave and the normal direction NL is parallel to the z-axis.

Furthermore, except for the condition that the wavefront of the plane wave is parallel to the z-axis, the phase shifter can deflect the beam. In other words, the moving direction of the plane wave can be changed by controlling the phase shifters of the transceiving unit array as a whole.

In 3G communication system, a base station covers a 120° sector. Therefore, three antennas are required to provide corresponding sectors for 360° coverage. Because each of the three antennas provides respective 120° coverage, fixed beams are emitted from the antennas of the 3G base station. Compared to 5G communication system, the 3G communication system at low frequency results in lower consumption. Therefore, the antennas of the base station of the 3G communication system can provide 120° coverage.

On the other hand, for the 5G communication technologies using the millimeter band, transmission of wireless communication signals result in higher consumption. In order to overcome such higher consumption phenomenon, the base station of the 5G communication system requires higher gain antenna array. However, the antenna gain and the angle of coverage are opposing factors. Higher antenna gain results in smaller coverage of the beam of the antenna array. To overcome the smaller coverage of the beam resulting from higher antenna gain, the antenna array of the 5G communication system should provide beam-steering function based on a beam deflection technology. For example, in the 5G communication system, to meet the requirement of 360° coverage by using three antenna arrays, each of which corresponds to 60° sectors, the beam directions may be controlled to vary with times to control each antenna array to scan over a 120° sector to and fro. The method for controlling the beam direction in the to-and-fro manner is called beam-steering technology.

As described above, for the 5G communication standards using the millimeter band, because the beam width is narrow, beam-steering function is required. Therefore, the transceiving unit array of the present application further has function of beam-steering.

Figure 12:
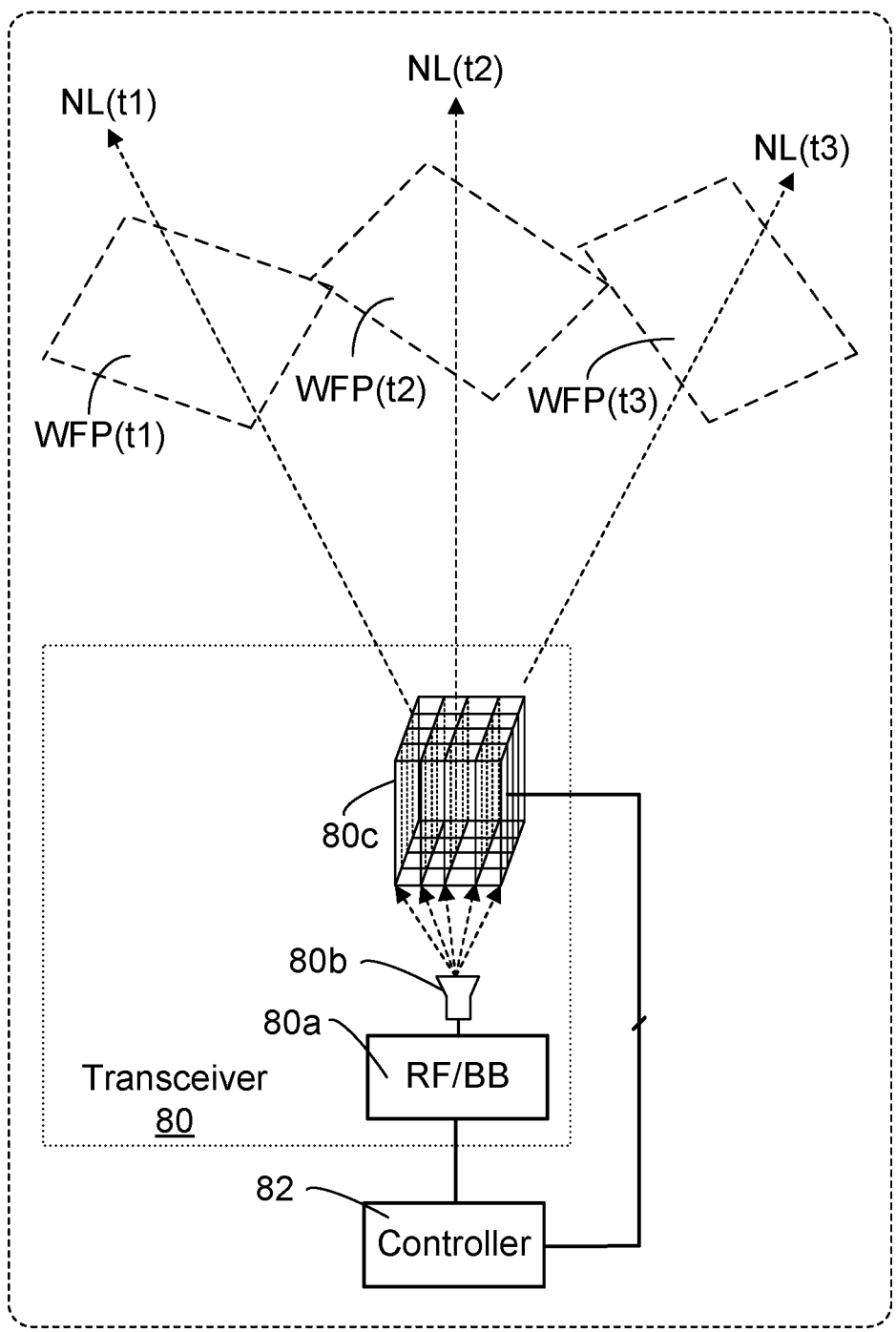
FIG. 12 is a schematic diagram illustrating that the direction of the plane wavefront of the external transmission signal transmitted by the transceiving unit of the transceiver is dynamically adjusted to achieve beam-steering.

Please refer to FIG. 12, a schematic diagram illustrating that the direction of the plane wavefront of the external transmission signal transmitted by the transceiving unit of the transceiver is dynamically adjusted to achieve beam-steering. The controller 82 is electrically connected to the radio frequency and base band circuit 80a and the transceiving unit array 80c.

The transceiver 80 includes the radio frequency and base band circuit 80a, the feeding antenna 80b and the transceiving unit array 80c. When the transceiver 80 transmits the external transmission signal Sext_tr, the beam of the radiately transmitted external transmission signal Sext_tr is deflected by adjustment with the phase shifters to achieve beamforming effect.

For example, in FIG. 12, at a time point t1, the controller 82 controls the transceiving unit array 80c to perform phase shift and strength adjustment to enable the plane wavefront WFP(t1) of the external transmission signal Sext_tr to move toward a first normal direction NL(t1). At a time point t2, the controller 82 controls the transceiving unit array 80c to perform phase shift and strength adjustment to change the plane wavefront WFP(t2) of the external transmission signal Sext_tr to move toward a second normal direction NL(t2). At a time point t3, the controller 82 controls the transceiving unit array 80c to perform phase shift and strength adjustment to change the plane wavefront WFP(t3) of the external transmission signal Sext_tr to move toward a third normal direction NL(t3).

By using polarization diversity, the communication device serving as a receiving end (user) can receive two data streams simultaneously so as to increase channel capacity and transmission rate. In these applications, the transceiving unit array may utilize dual-polarized feeding antenna which generate beams at different polarization pointing to a single user to achieve multiple-input and multiple-output (MIMO).

Figure 13:
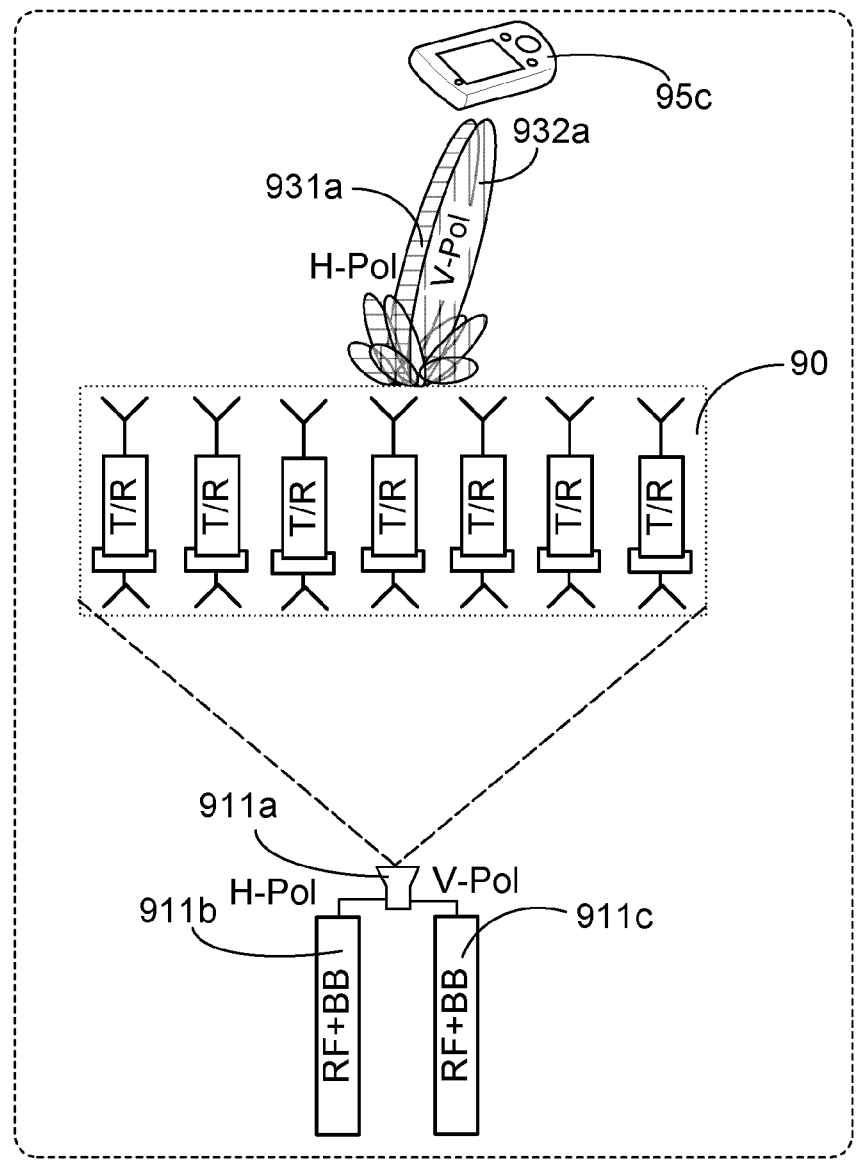
FIG. 13 is a schematic diagram illustrating that a dual-polarized feeding antenna simultaneously transmits a horizontally-polarized transmission wireless communication signal and a vertically-polarized wireless communication signal to a single mobile phone.

Please refer to FIG. 13, a schematic diagram illustrating that a dual-polarized feeding antenna simultaneously transmits a horizontally-polarized transmission wireless communication signal and a vertically-polarized wireless communication signal to a single mobile phone. The horizontally-polarized (H-Pol) internal transmission signal and the vertically-polarized (V-Pol) internal transmission signal are independently provided by the radio frequency and base band circuits 911b, 911c. That is to say, the radio frequency and base band circuits 911b, 911c generate two data streams. It is assumed that the radio frequency and base band circuits 911b, 911c share the dual-polarized feeding antenna 911a, and the dual-polarized feeding antenna 911a can simultaneously radiate the internal transmission signals Sint_tr at dual-polarization (horizontal polarization (H-Pol) and vertical polarization (V-Pol)) to the transceiving unit array 90.

After the transceiving unit array 90 receives the internal transmission signals Sint_tr, different transceiving units transform the internal transmission signals Sint_tr into the external transmission signals Sext_tr according to the polarization. The transceiving units of the first subunit array transmit the horizontally-polarized (H-Pol) external transmission signal 931a to the user mobile phone 95c after the transformation. The transceiving units of the second subunit array transmit the vertically-polarized (V-Pol) external transmission signal 932a to the user mobile phone 95c after the transformation.

In this diagram, the user mobile phone 95c can simultaneously receive two data streams. Accordingly, the channel capacity between the transceiver and the mobile phone 95c increases, and the transmission rate between the base station and the mobile phone is raised. The horizontally-polarized (H-Pol) external transmission signal Sext_tr and the vertically-polarized (V-Pol) external transmission signal Sext_tr transmitted by the transceiving unit array points to the same user mobile phone 95c. Accordingly, the transceiver of the present disclosure supports single-user MIMO.

Figure 14:
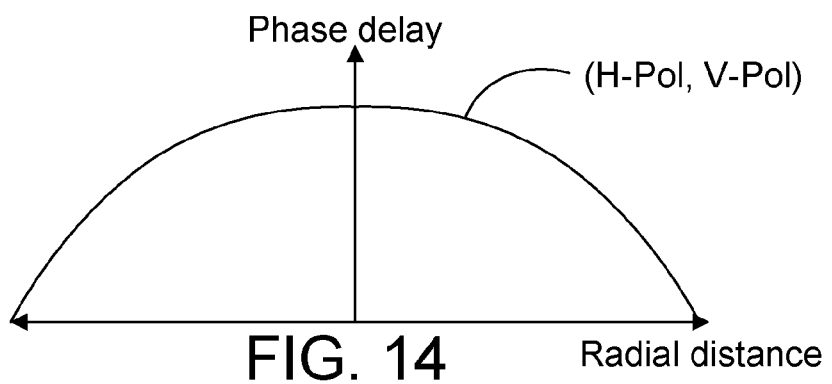
FIG. 14 is a schematic diagram illustrating how the transceiving units of the transceiving unit array adjust phase delays of the horizontally-polarized internal transmission signal and the vertically-polarized internal transmission signal when the wireless communication signal is transmitted as shown in FIG. 13.

Please refer to FIG. 14, a schematic diagram illustrating how the transceiving units of the transceiving unit array adjust phase delays of the horizontally-polarized internal transmission signal and the vertically-polarized internal transmission signal when the wireless communication signal is transmitted as shown in FIG. 13. The horizontal axis represents a radial distance indicating the relative position of the transceiving unit in the transceiving unit array 90. The vertical axis represents a phase delay indicating the adjustment of the phase delay introduced to the internal transmission signal Sint_tr by the transceiving unit. The intersection of the horizontal axis and the vertical axis corresponds to the transceiving unit located at the center of the transceiving units. Because the horizontally-polarized internal transmission signal Sint_tr and the vertically-polarized internal transmission signal Sint_tr are generated and radiated by the same feeding antenna, the adjusted phase delays which are provided by the transceiving unit array and introduced to the horizontally-polarized internal transmission signal Sint_tr are consistent with those introduced to the vertically-polarized internal transmission signal Sint_tr.

Figure 15:
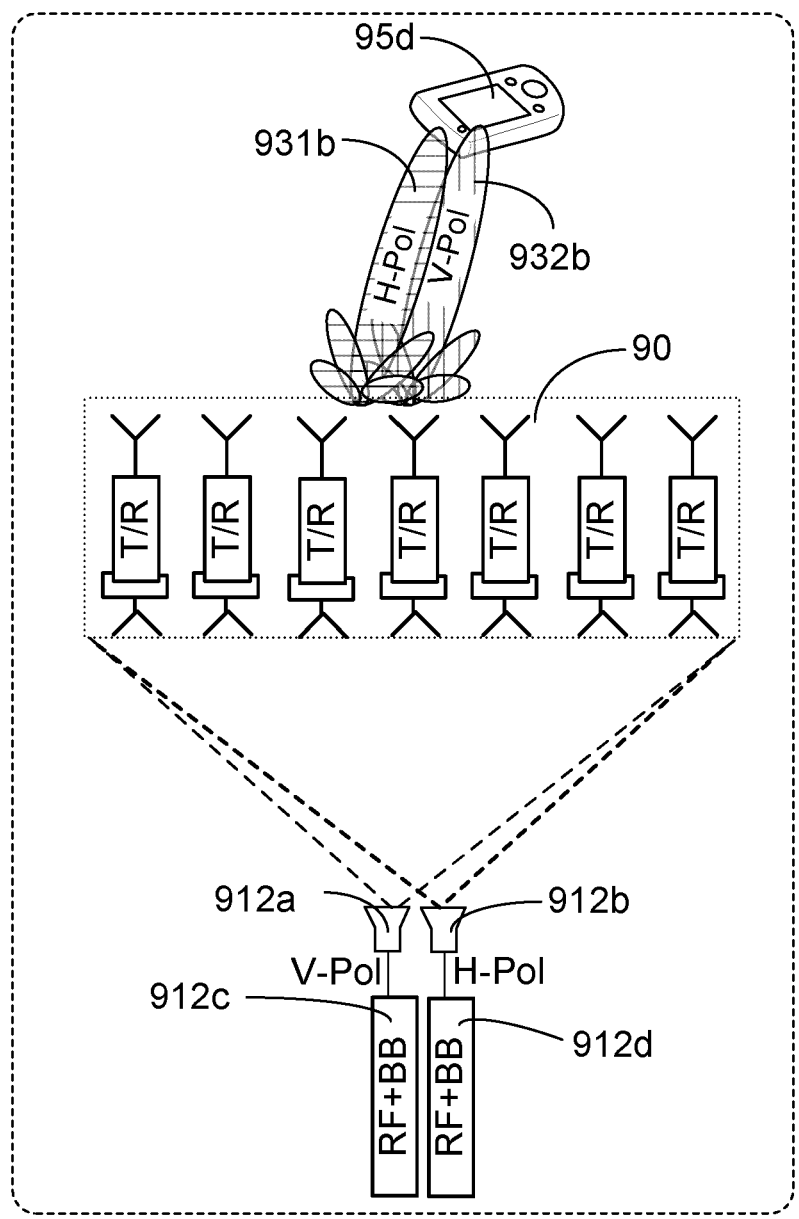
FIG. 15 is a schematic diagram illustrating that two feeding antennas transmit horizontally-polarized transmission signals and vertically-polarized transmission signals to a single mobile phone simultaneously and respectively.

Please refer to FIG. 15, a schematic diagram illustrating that two feeding antennas transmit horizontally-polarized transmission signals and vertically-polarized transmission signals to a single mobile phone simultaneously and respectively. It shows that the present disclosure can use two feeding antennas at respective different polarization. The two data streams generated by the radio frequency and base band circuits 912c, 912d are transmitted via the feeding antennas 912a, 912b, respectively. The feeding antenna 912b transmits the horizontally-polarized (H-Pol) internal transmission signal Sint_tr, and the feeding antenna 912a transmits the vertically-polarized (V-Pol) internal transmission signal Sint_tr.

Then, in the transceiving unit array 90, the transceiving units of the first subunit array transforms the horizontally-polarized (H-Pol) internal transmission signal Sint_tr into the horizontally-polarized (H-Pol) external transmission signal 931b, the transceiving units of the second subunit array transforms the vertically-polarized (V-Pol) internal transmission signal Sint_tr into the vertically-polarized (V-Pol) external transmission signal 932b. The user mobile phone 95d can simultaneously receive two data streams through the horizontally-polarized (H-Pol) external transmission signal 931b and the vertically-polarized (V-Pol) external transmission signal 932b. Therefore, it increases the channel capacity and transmission rate of the transceiver according to the present disclosure.

In FIG. 13 and FIG. 15, the horizontally-polarized external transmission signal and the vertically-polarized external transmission signal are transmitted from the same transmitter device to the same receiver device. Therefore, the relation between the phase delay and the radial distance in FIG. 14 is applicable to the horizontally-polarized internal transmission signal and the vertically-polarized internal transmission signal transmitted by the transceiving unit array in FIG. 15. By the way, the transmitter device and the receiver device in the description may be base stations, mobile phones, handheld devices or other electronic devices with communication function.

According to the concepts of the present disclosure, the transceiving unit array is reconfigurable to adjust the focus in response to various applications or adjust according to various antennas. FIGS. 13~15 show that the transmitting and receiving antenna may be a dual-polarized feeding antenna, or includes two feeding antennas at orthogonal polarization. By adjusting the phase shifters of the transceiving unit array, phase distribution corresponding to the transceiving circuits for the orthogonal polarization is different so as to generate beams toward different directions to provide service to different users. In addition to increasing the channel capacity for a single user, the transceiver can support multi-user applications. In the description with reference to FIG. 16 and the following drawings, the transceiver can support multiple feeding antennas. After the transceiving unit array receives the internal transmission signal Sint_tr from the multiple antennas, multiple beams involving the external transmission signal Sext_tr are correspondingly generated to simultaneously serve multiple users. The actual quantity of the beams involving the external transmission signals Sext_tr varies with factors of user number, polarization of the internal transmission signal Sint_tr transmitted by the feeding antenna, feeding antenna number, etc.

According to the concepts of the present disclosure, the transceiving unit array may use a single dual-polarized feeding antenna to support two-user MIMO. The horizontally-polarized external transmission signal Sext_tr and the vertically-polarized external transmission signal Sext_tr generated by the transceiving unit array have various phase distribution according to the users positions. It supports two-user MIMO by generating two beams involving the external transmission signals Sext_tr at different polarization.

Figure 16:
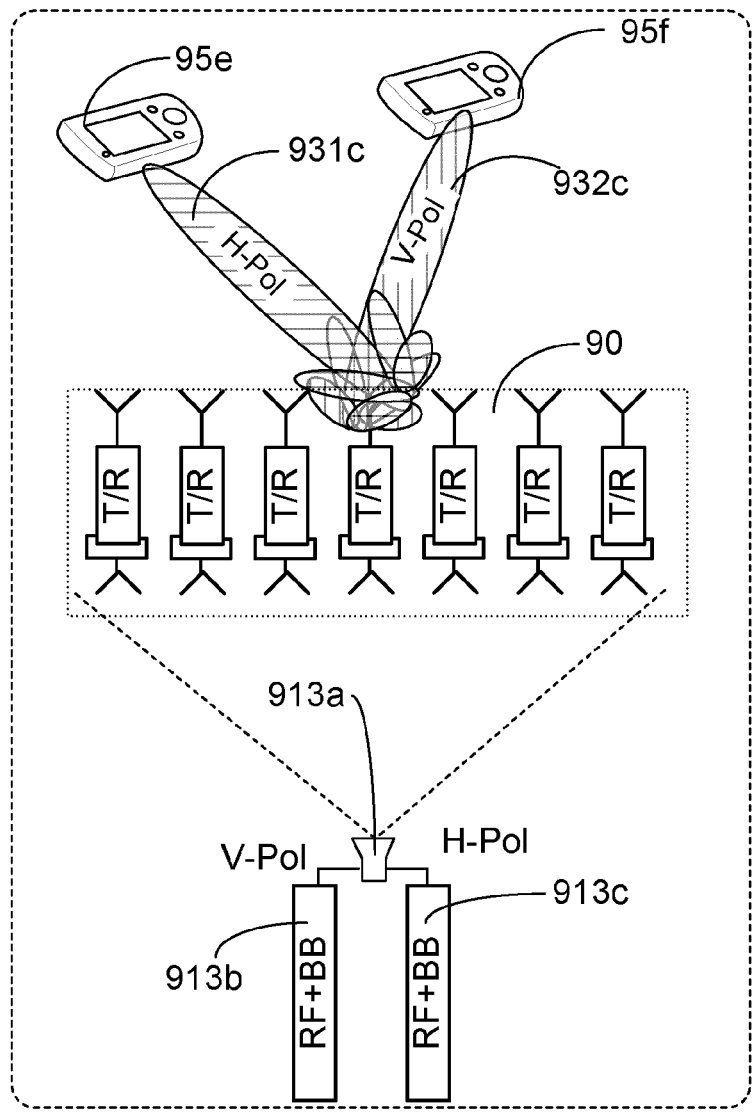
FIG. 16 is a schematic diagram illustrating that one feeding antenna transmits horizontally-polarized transmission signals and vertically-polarized transmission signals to two mobile phones, respectively.

Please refer to FIG. 16, a schematic diagram illustrating that one feeding antenna transmits horizontally-polarized transmission signals and vertically-polarized transmission signals to two mobile phones, respectively. The radio frequency and base band circuits 913b, 913c share the dual-polarized feeding antenna 913a. The radio frequency and base band circuit 913b generates the vertically-polarized (V-Pol) external transmission signal 932c, and the radio frequency and base band circuit 913c generates the horizontally-polarized (H-Pol) external transmission signal 931c.

In this diagram, the transceiving unit array 90 utilizes different methods to adjust the phase shifters and the transmitting amplifiers of the transceiving units. That is to say, the phase shifters and the transmitting amplifiers of the transceiving units of the first subunit array adjust the transmission paths of the horizontally-polarized internal transmission signal Sint_tr; the phase shifters and the transmitting amplifiers of the transceiving units of the second subunit array adjust the transmission paths of the vertically-polarized internal transmission signal Sint_tr. Therefore, the horizontally-polarized (H-Pol) external transmission signal 931c and the vertically-polarized (V-Pol) external transmission signal 932c generated by the transceiving unit array 90 have different phase distribution. The beam directions are also different. Hence, different beams may provide services to different user mobile phones, respectively. For example, the horizontally-polarized (H-Pol) external transmission signal 931c are transmitted to the mobile phone 95e, and the vertically-polarized (V-Pol) external transmission signal 932c are transmitted to the mobile phone 95f.

Figure 17:
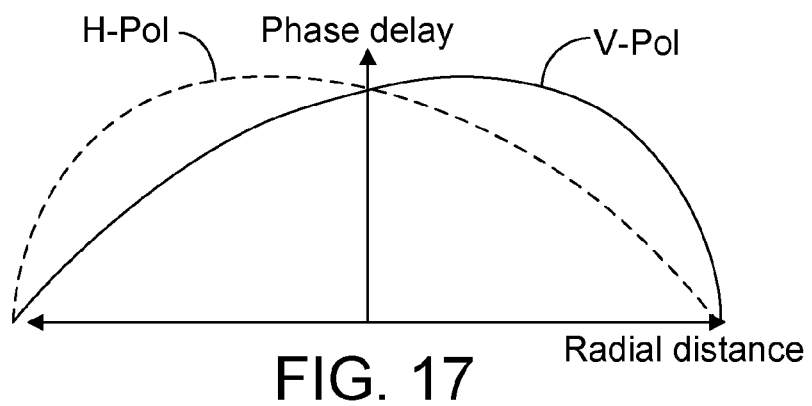
FIG. 17 is a schematic diagram illustrating how the transceiving units of the transceiving unit array adjust phase delays of the horizontally-polarized internal transmission signal and the vertically-polarized internal transmission signal when the wireless communication signal is transmitted as shown in FIG. 16.

Please refer to FIG. 17, a schematic diagram illustrating how the transceiving units of the transceiving unit array adjust phase delays of the horizontally-polarized internal transmission signal and the vertically-polarized internal transmission signal when the wireless communication signal is transmitted as shown in FIG. 16. Because the positions of the mobile phones 95e, 95f relative to the transceiving unit array 90 are different, the transceiving units of the first subunit array and the transceiving units of the second subunit array of the transceiving unit array adjust the phases and gains of the horizontally-polarized (H-Pol) internal transmission signal and the vertically-polarized (V-Pol) internal transmission signal in different manners.

In FIG. 17, the dotted line represents the phase delay introduced to the horizontally-polarized (H-Pol) internal transmission signal Sint_tr by the transceiving units of the first subunit array; the solid line represents the phase delay introduced to the vertically-polarized (V-Pol) internal transmission signal Sint_tr by the transceiving units of the second subunit array. In FIG. 16, although the horizontally-polarized (H-Pol) internal transmission signal Sint_tr and the vertically-polarized (V-Pol) internal transmission signal Sint_tr are transmitted by the same feeding antenna 913a, the transformation of the internal transmission signal Sint_tr at different polarization performed by the first subunit array and the second subunit array is not the same.

In the first subunit array, the transceiving units at the right half of the transceiving unit array 90 should provide less adjustment to the horizontally-polarized (H-Pol) internal transmission signal; the transceiving units at the left half of the transceiving unit array 90 should provide more adjustment to the horizontally-polarized (H-Pol) internal transmission signal. On the other hand, in the second subunit array, the transceiving units at the right half of the transceiving unit array 90 should provide more adjustment to the vertically-polarized (V-Pol) internal transmission signal; the transceiving units at the left half of the transceiving unit array 90 should provide less adjustment to the vertically-polarized (V-Pol) internal transmission signal.

Figure 18:
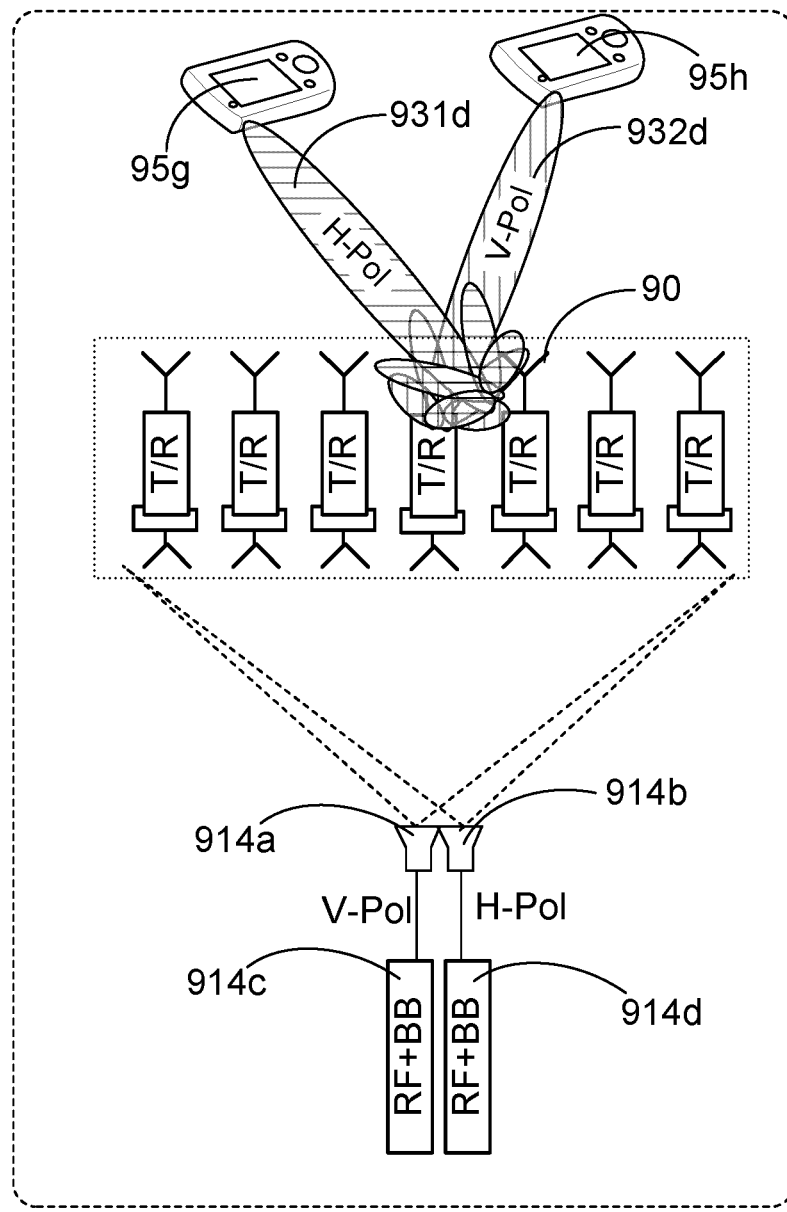
FIG. 18 is a schematic diagram illustrating that two feeding antennas transmit horizontally-polarized transmission signals and vertically-polarized transmission signals to two mobile phones, respectively.

Please refer to FIG. 18, a schematic diagram illustrating that two feeding antennas transmit horizontally-polarized transmission signals and vertically-polarized transmission signals to two mobile phones, respectively. It shows that the present disclosure can use two feeding antennas to respectively transmit the internal transmission signals Sint_tr at different polarization. The two data streams generated by the radio frequency and base band circuits 914c, 914d are radiately transmitted via the feeding antennas 914a, 914b, respectively. The user mobile phone 95g receives the horizontally-polarized (H-Pol) external transmission signal 931d, and receives one data stream through the horizontally-polarized (H-Pol) external transmission signal 931d. Meanwhile, the user mobile phone 95h receives the vertically-polarized (V-Pol) external transmission signal 932d, and receives the other data stream through the vertically-polarized (V-Pol) external transmission signal 932d. Therefore, the transceiver according to the concepts of the present disclosure can take advantage of signal transmission at different polarization to increase the channel capacity and transmission rate of the wireless transmission signals.

In FIG. 16 and FIG. 18, the relative positions between the two users are substantially the same. Therefore, the relation between the phase delay and the radial distance in FIG. 17 is applicable to the horizontally-polarized internal transmission signal and the vertically-polarized internal transmission signal transmitted by the transceiving unit array 90 in FIG. 18.

Figure 19A:
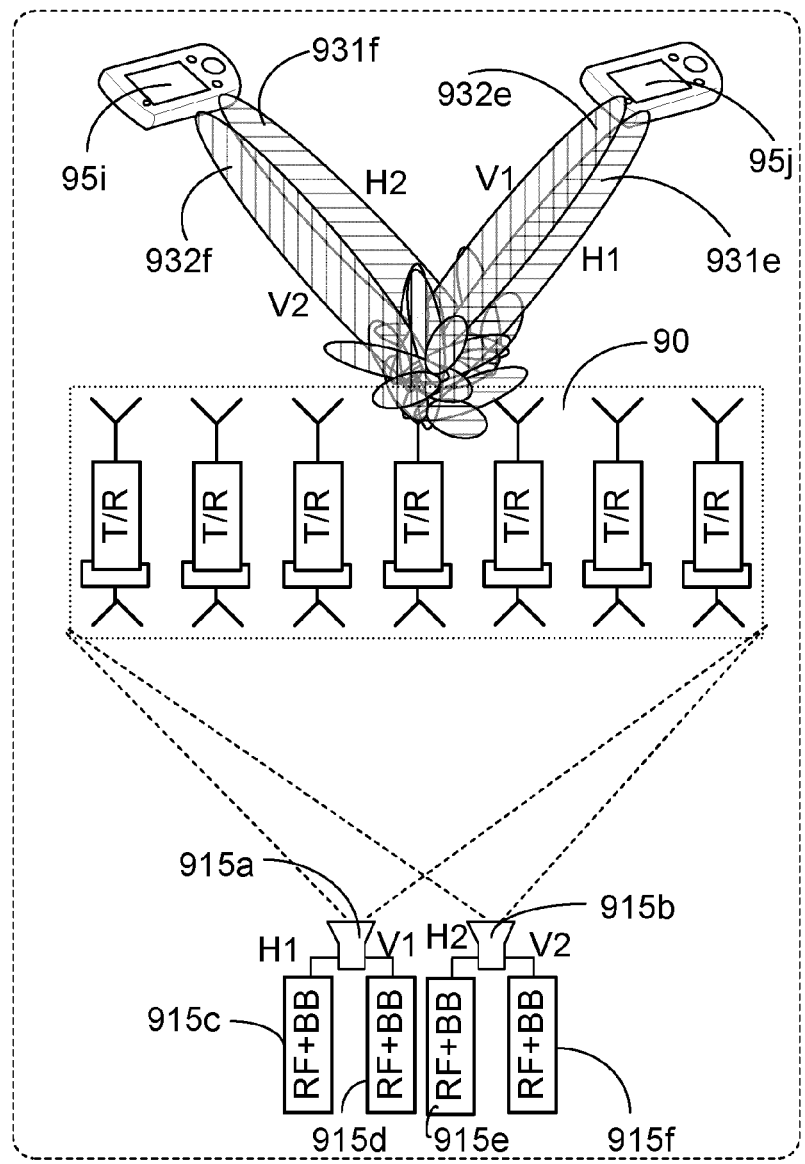
FIG. 19A is a schematic diagram illustrating that two feeding antennas transmit two sets of horizontally-polarized transmission signals and vertically-polarized transmission signals to two mobile phones separated by a longer distance.

Please refer to FIG. 19A, a schematic diagram illustrating that two feeding antennas transmit two sets of horizontally-polarized transmission signals and vertically-polarized transmission signals to two mobile phones separated by a longer distances. A first set of horizontally-polarized (H1) internal transmission signal which is generated by the radio frequency and base band circuit 915c and a first set of vertically-polarized (V1) internal transmission signal which is generated by the radio frequency and base band circuit 915d are transmitted via the dual-polarized feeding antenna 915a. A second set of horizontally-polarized (H2) internal transmission signal which is generated by the radio frequency and base band circuit 915e and a second set of vertically-polarized (V2) internal transmission signal which is generated by the radio frequency and base band circuit 915f are transmitted via the dual-polarized feeding antenna 915b.

The transceiving unit array 90 perform transformation to generate and transmit a first set of horizontally-polarized (H1) external transmission signal 931e, a first set of vertically-polarized (V1) external transmission signal 932e, a second set of horizontally-polarized (H2) external transmission signal 931f and a second set of vertically-polarized (V2) external transmission signal 932f to the users. The first set of horizontally-polarized (H1) external transmission signal 931e and the first set of vertically-polarized (V1) external transmission signal 932e are transmitted to the mobile phone 95j. The second set of horizontally-polarized (H2) external transmission signal 931f and the second set of vertically-polarized (V2) external transmission signal 932f are transmitted to the mobile phone 95i.

Figure 19B:
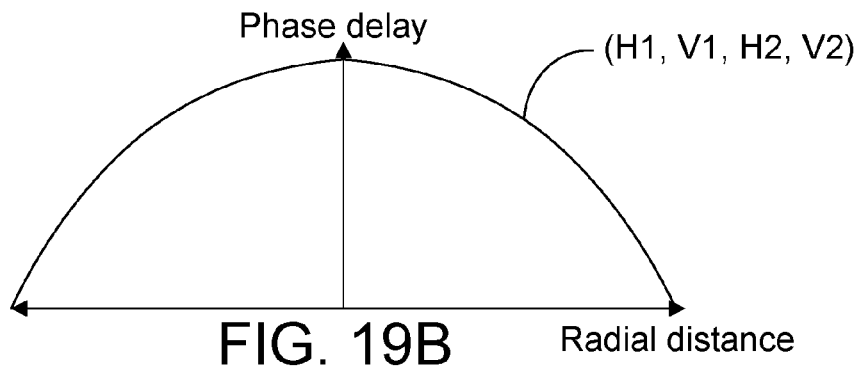
FIG. 19B is a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 19A.

Please refer to FIG. 19B, a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 19A. The first set of horizontally-polarized (H1) internal transmission signal and the first set of vertically-polarized (V1) internal transmission signal are radiately generated by the same feeding antennas 915a and transmitted to the same mobile phone 95j. The second set of horizontally-polarized (H2) internal transmission signal and the second set of vertically-polarized (V2) internal transmission signal are radiately generated by the same feeding antenna 915b and transmitted to the same mobile phone 95i. Therefore, in FIG. 19B, the adjusted phase delays which are provided by the transceiving unit array 90 and introduced to the horizontally-polarized (H-Pol) internal transmission signals Sint_tr (including the first set at the horizontal polarization (H1) and the second set at the horizontal polarization (H2)) are consistent with those introduced to the vertically-polarized (V-Pol) internal transmission signals Sint_tr (including the first set at the vertical polarization (V1) and the second set at the vertical polarization (V2)).

Figure 20A:
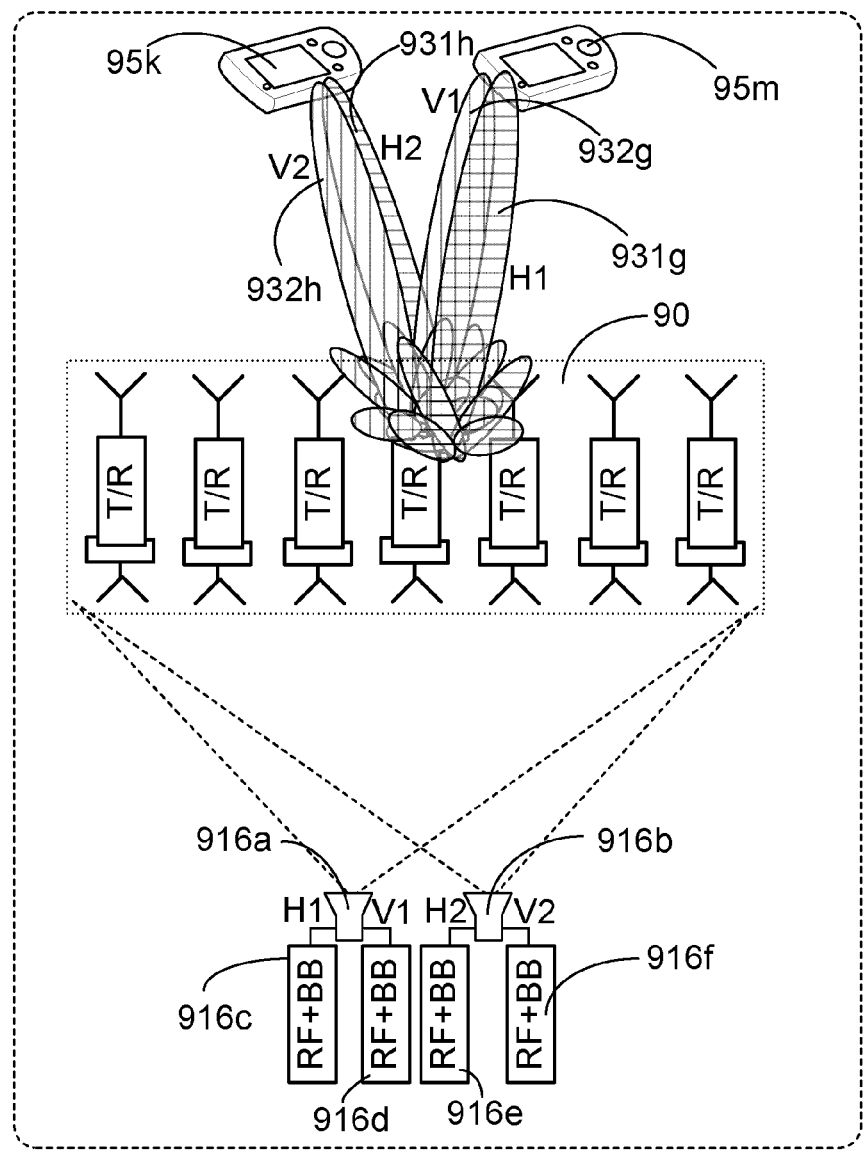
FIG. 20A is a schematic diagram illustrating that two feeding antennas transmit two sets of horizontally-polarized transmission signals and vertically-polarized transmission signals to two mobile phones separated by a shorter distance.

Please refer to FIG. 20A, a schematic diagram illustrating that two feeding antennas transmit two sets of horizontally-polarized transmission signals and vertically-polarized transmission signals to two mobile phones separated by a longer distance. Compared to FIG. 19A, the relative distance between the mobile phones 95k, 95m is shorter.

The first set of horizontally-polarized (H1) internal transmission signal which is generated by the radio frequency and base band circuit 916c and the first set of vertically-polarized (V1) internal transmission signal which is generated by the radio frequency and base band circuit 916d are transmitted via the dual-polarized feeding antenna 916a. The second set of horizontally-polarized (H2) internal transmission signal which is generated by the radio frequency and base band circuit 916e and the second set of vertically-polarized (V2) internal transmission signal which is generated by the radio frequency and base band circuit 916f are transmitted via the dual-polarized feeding antenna 916b.

The transceiving unit array 90 generates and transmits the first set of horizontally-polarized (H1) external transmission signal 931g, the first set of vertically-polarized (V1) external transmission signal 932g, the second set of horizontally-polarized (H2) external transmission signal 931h and the second set of vertically-polarized (V2) external transmission signal 932h to the users. The first set of horizontally-polarized (H1) external transmission signal 931g and the first set of vertically-polarized (V1) external transmission signal 932g are transmitted to the mobile phone 95m. The second set of horizontally-polarized (H2) external transmission signal 931h and the second set of vertically-polarized (V2) external transmission signal 932h are transmitted to the mobile phone 95k.

Figure 20B:
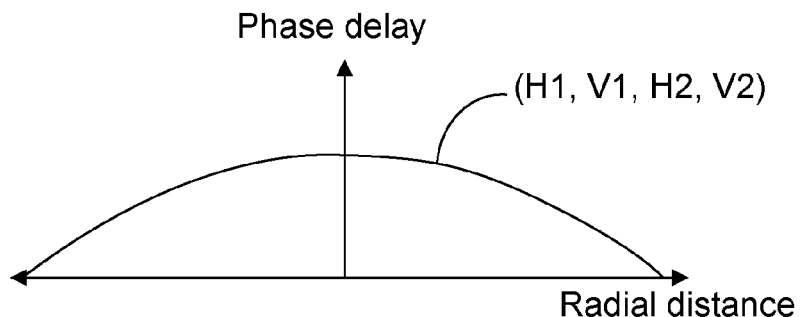
FIG. 20B is a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 20A.

Please refer to FIG. 20B, a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 20A. In FIG. 20A, the relation between the polarization of the internal transmission signals Sint_tr transmitted by the feeding antennas and the external transmission signals Sext_tr received by the mobile phones is similar to that in FIG. 19A. Therefore, in FIG. 20B, the adjusted phase delays which are provided by the transceiving unit array 90 and introduced to the horizontally-polarized (H-Pol) internal transmission signals Sint_tr (including the first set at the horizontal polarization (H1) and the second set at the horizontal polarization (H2)) are consistent with those introduced to the vertically-polarized (V-Pol) internal transmission signals Sint_tr (including the first set at the vertical polarization (V1) and the second set at the vertical polarization (V2)).

In FIG. 20A, because the relative distance between the mobile phones 95k, 95m is shorter, the transceiving unit array 90 transmits the external transmission signals Sext_tr within smaller angle. Therefore, the adjusted phase delays which are provided by the transceiving unit array 90 in FIG. 20A and introduced to the internal transmission signals Sint_tr is less than the adjusted phase delays which are provided by the transceiving unit array 90 in FIG. 19A and introduced to the internal transmission signals Sint_tr. The adjusted phase delays, as shown in FIG. 20B, provided by the transceiving unit array 90 and introduced to the internal transmission signals Sint_tr is less than the adjusted phase delays as shown in FIG. 19B.

Figure 21A:
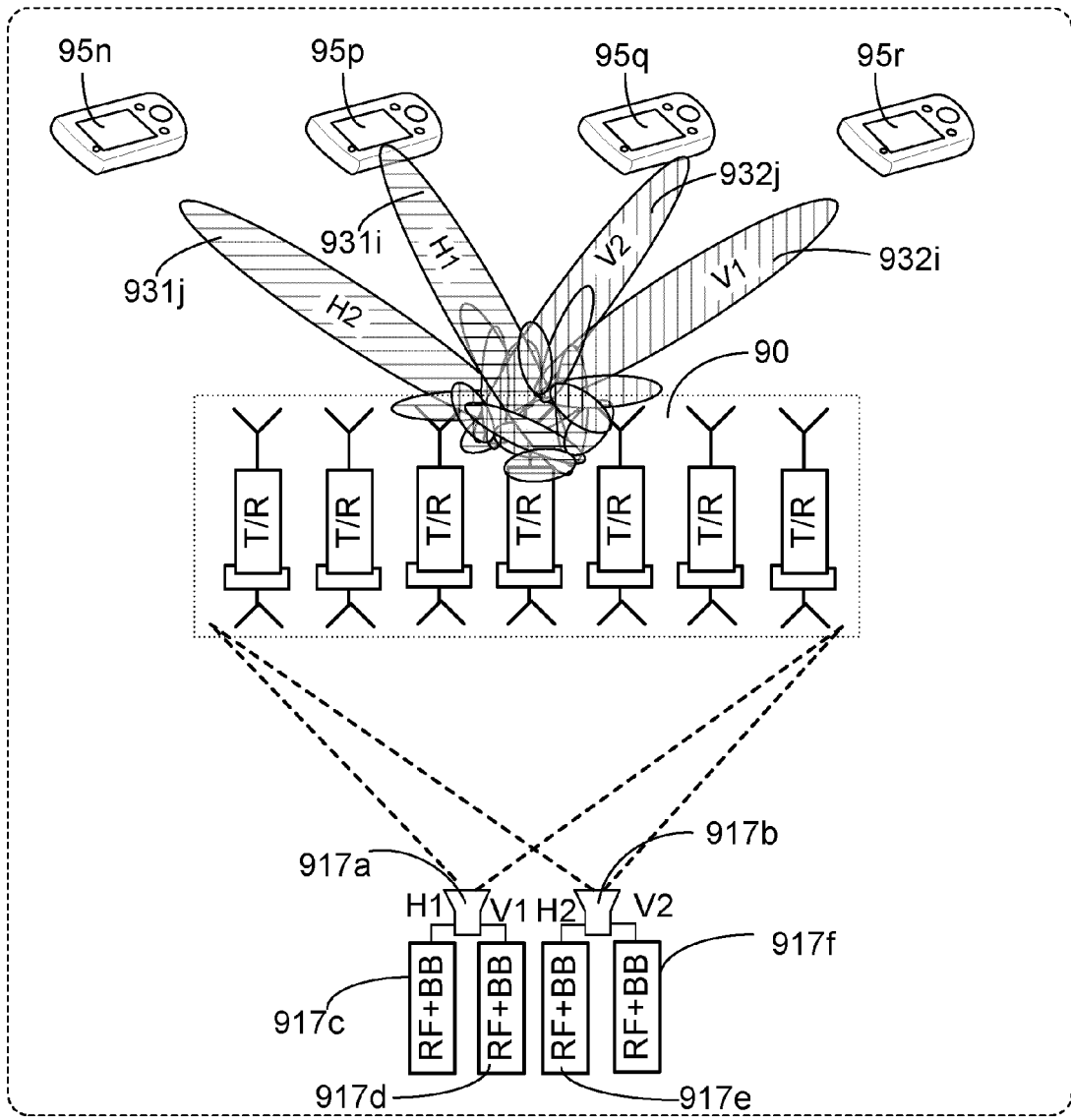
FIG. 21A is a schematic diagram illustrating that two feeding antennas transmit two sets of horizontally-polarized transmission signals and vertically-polarized transmission signals to four mobile phones separated by longer distances.

Please refer to FIG. 21A, a schematic diagram illustrating that two feeding antennas transmit two sets of horizontally-polarized transmission signals and vertically-polarized transmission signals to four mobile phones separated by longer distances. Four radio frequency and base band circuits 917c, 917d, 917e, 917f respectively generate two sets of horizontally-polarized (H1, H2) internal transmission signal Sint_tr and two sets of vertically-polarized (V1, V2) internal transmission signal Sint_tr which are transmitted via two dual-polarized feeding antennas 917a, 917b. The dual-polarized feeding antenna 917a radiates the first set of horizontally-polarized (H1) internal transmission signal Sint_tr and the first set of vertically-polarized (V1) internal transmission signal Sint_tr. The dual-polarized feeding antenna 917b radiates the second set of horizontally-polarized (H2) internal transmission signal Sint_tr and the second set of vertically-polarized (V2) internal transmission signal Sint_tr.

The transceiving unit array 90 simultaneously receives the first set of horizontally-polarized (H1) internal transmission signal, the first set of vertically-polarized (V1) internal transmission signal Sint_tr, the second set of horizontally-polarized (H2) internal transmission signal Sint_tr and the second set of vertically-polarized (V2) internal transmission signal Sint_tr, and then transforms them into the external transmission signals Sext_tr at corresponding polarization. The external transmission signals Sext_tr includes: the first set of horizontally-polarized (H1) external transmission signal 931i which is transformed from the received first set of horizontally-polarized (H1) internal transmission signal and then transmitted to the mobile phone 95p; the first set of vertically-polarized (V1) external transmission signal 932i which is transformed from the received first set of vertically-polarized (V1) internal transmission signal Sint_tr and then transmitted to the mobile phone 95r; the second set of horizontally-polarized (H2) external transmission signal 931j which is transformed from the received second set of horizontally-polarized (H2) internal transmission signal Sint_tr and then transmitted to the mobile phone 95n; and the second set of vertically-polarized (V2) external transmission signal 932j which are transformed from the received second set of vertically-polarized (V2) internal transmission signal Sint_tr and then transmitted to the mobile phone 95q.

As described above, in FIG. 21A, the two sets of horizontally-polarized (H1, H2) external transmission signal are transmitted to the left mobile phone; the two sets of vertically-polarized (V1, V2) external transmission signal are transmitted to the right mobile phone.

Figure 21B:
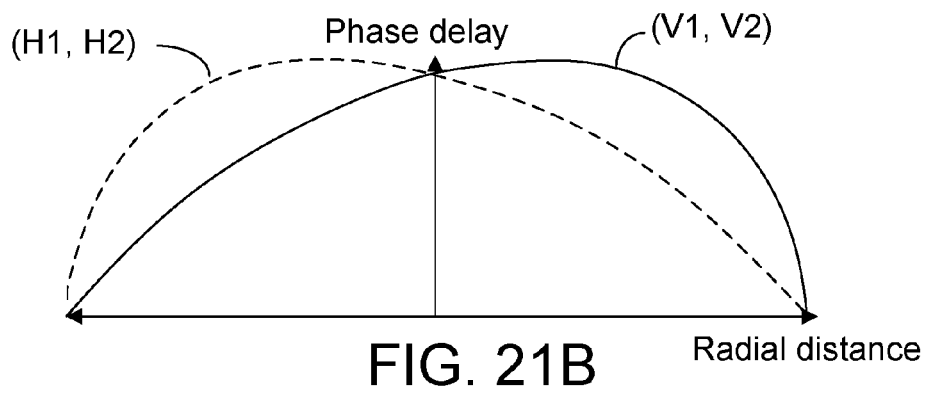
FIG. 21B is a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 21A.

Please refer to FIG. 21B, a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 21A. In FIG. 21A, although the first set of horizontally-polarized (H1) internal transmission signal Sint_tr and the first set of vertically-polarized (V1) internal transmission signal are transmitted via the same feeding antenna 917a, the first set of horizontally-polarized (H1) external transmission signal 931i and the first set of vertically-polarized (V1) external transmission signal 932i are transmitted to different mobile phones 95p, 95r. Similarly, although the second set of horizontally-polarized (H2) internal transmission signal Sint_tr and the second set of vertically-polarized (V2) internal transmission signal Sint_tr are transmitted via the same feeding antenna 917b, the second set of horizontally-polarized (H2) external transmission signal 931j and the second set of vertically-polarized (V2) external transmission signal 932*j* are transmitted to different mobile phones 95*n*, 95*q*. Therefore, the adjusted phase delays which are provided by the transceiving units of the first subunit array and introduced to the first set and the second set of the horizontally-polarized (H1, H2) internal transmission signal Sint_tr are inconsistent with the adjusted phase delays which are provided by the transceiving units of the second subunit array and introduced to the first set and the second set of the vertically-polarized (V1, V2) internal transmission signal Sint_tr.

In the first subunit array, the transceiving units at the right half of the transceiving unit array 90 should provide smaller phase delay adjustment to the horizontally-polarized (H-Pol) internal transmission signals Sint_tr, the transceiving units at the left half of the transceiving unit array 90 should provide greater phase delay adjustment to the horizontally-polarized (H-Pol) internal transmission signals Sint_tr. On the other hand, in the second subunit array, the transceiving units at the right half of the transceiving unit array 90 should provide greater phase delay adjustment to the vertically-polarized (V-Pol) internal transmission signals; the transceiving units at the left half of the transceiving unit array 90 should provide smaller phase delay adjustment to the vertically-polarized (V-Pol) internal transmission signals.

Figure 22A:
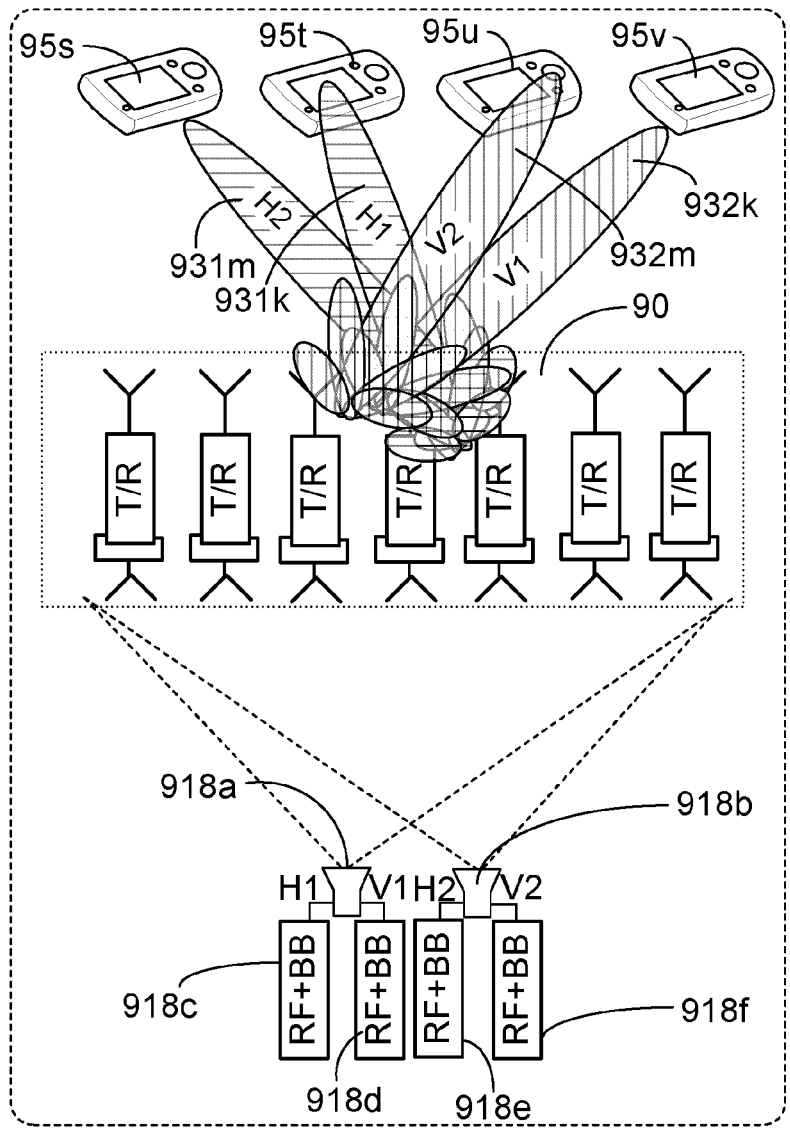
FIG. 22A is a schematic diagram illustrating that two feeding' antennas transmit two sets of horizontally-polarized transmission signals and vertically-polarized transmission signals to four mobile phones separated by shorter distances.

Please refer to FIG. 22A, a schematic diagram illustrating that two feeding antennas transmit two sets of horizontally-polarized transmission signals and vertically-polarized transmission signals to four mobile phones separated by shorter distances. Compared to FIG. 21A, the relative distances between the mobile phones 95*s*, 95*t*, 95*u*, 95*v* are shorter. The radio frequency and base band circuits 918*c*, 918*d*, 918*e*, 918*f* respectively generate two sets of horizontally-polarized (H1, H2) internal transmission signal Sint_tr and two sets of vertically-polarized (V1, V2) internal transmission signal Sint_tr which are transmitted via two dual-polarized feeding antennas 918*a*, 918*b*.

The transceiving unit array 90 receives the first set of horizontally-polarized (H1) internal transmission signal, the first set of vertically-polarized (V1) internal transmission signal, the second set of horizontally-polarized (H2) internal transmission signal and the second set of vertically-polarized (V2) internal transmission signal, and then transforms them into the corresponding external transmission signals Sext_tr. The first set of horizontally-polarized (H1) external transmission signal 931*k* is transmitted to the mobile phone 95*t*. The first set of vertically-polarized (V1) external transmission signal 932*k* is transmitted to the mobile phone 95*v*. The second set of horizontally-polarized (H2) external transmission signal 931*m* is transmitted to the mobile phone 95*s*. The second set of vertically-polarized (V2) external transmission signal 932*m* is transmitted to the mobile phone 95*u*.

Figure 22B:
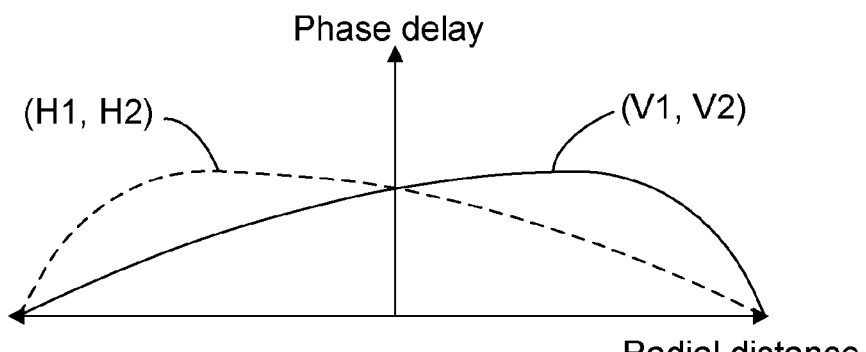
FIG. 22B is a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 22A.

Please refer to FIG. 22B, a schematic diagram illustrating how the transceiving units of the transceiving unit array adjust phase delays of the horizontally-polarized internal transmission signals and the vertically-polarized internal transmission signals when the wireless communication signal is transmitted as shown in FIG. 22A. In FIG. 22A, the relation between the polarization of the internal transmission signals Sint_tr transmitted via the feeding antennas and the external transmission signals Sext_tr received by the mobile phones is similar to that in FIG. 21A. Therefore, in FIG. 22B, the phase delay adjustment which is provided by the transceiving unit array 90 and introduced to the horizontally-polarized (H-Pol) internal transmission signals Sint_tr and the vertically-polarized (V-Pol) internal transmission signals Sint_tr is similar to those in FIG. 21B.

In FIG. 22A, because the relative distances between the mobile phones 95*s*, 95*t*, 95*u*, 95*v* are shorter, the transceiving unit array 90 transmits the external transmission signals Sext_tr within smaller angle. Therefore, the adjusted phase delays, as shown in FIG. 22B, provided by the transceiving unit array 90 and introduced to the internal transmission signals Sint_tr are less than those shown in FIG. 21B.

According to the concepts of the present disclosure, it is not intended to limit the number of the radio frequency and base band circuit(s), the feeding antenna(s) and the user(s) and corresponding relations therebetween. Referring to the examples with reference to FIG. 13 to FIG. 22A and FIG. 22B, the number of the radio frequency and base band circuit(s), the feeding antenna(s) and the user(s) is adjustable for different applications. It is to be noted that the relative positions of the radio frequency and base band circuit(s), the feeding antenna(s) and the user(s) are arranged in one dimension in FIG. 13 to FIG. 22A and FIG. 22B for illustration purposes only. However, the radio frequency and base band circuit(s), the feeding antenna(s) and the user(s) may be arranged in two dimensions in real applications.

Figures 23A, 23B:
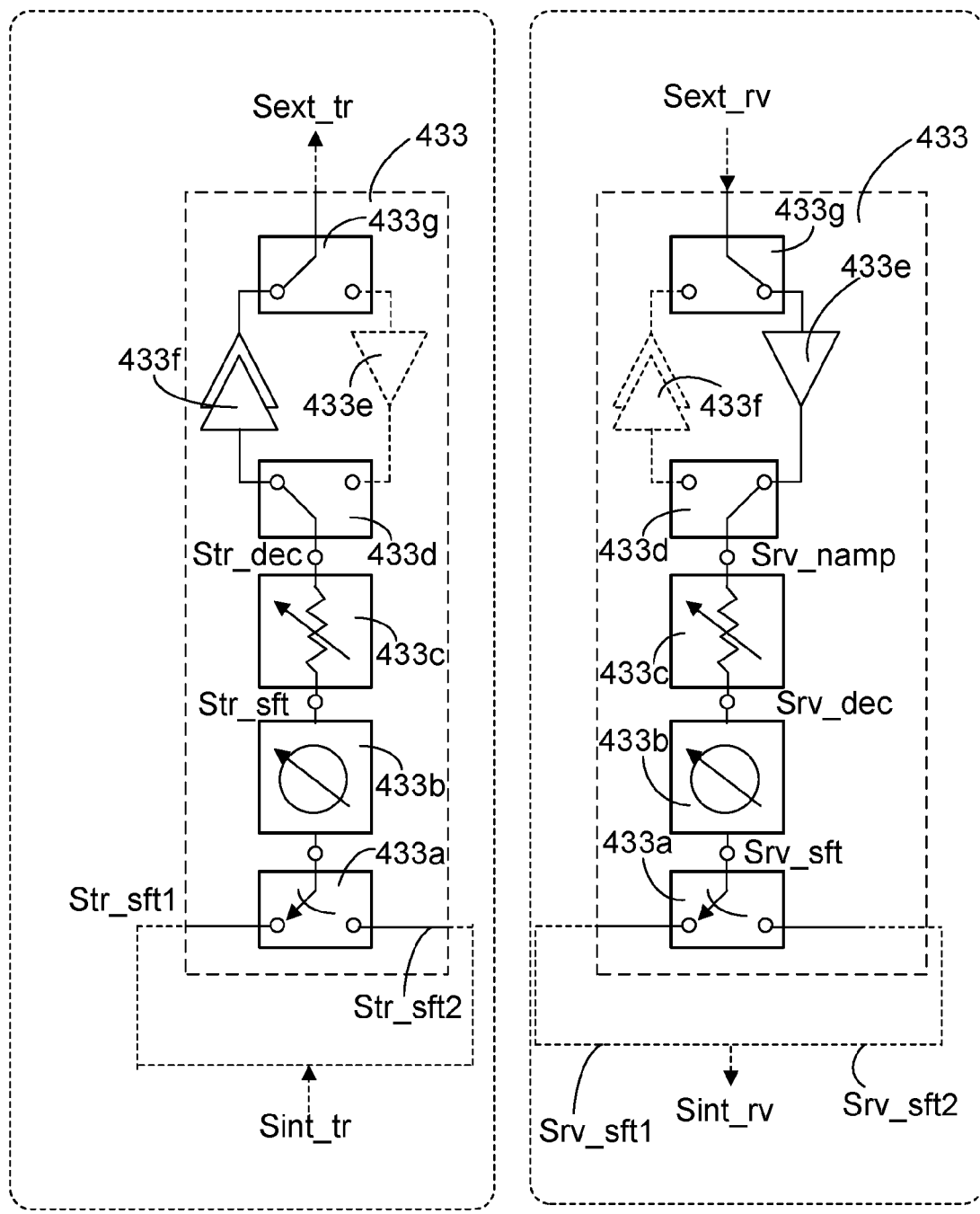
FIG. 23A is a schematic diagram illustrating the transceiving circuit in FIG. 6A which is used in a transmitter.
FIG. 23B is a schematic diagram illustrating the transceiving circuit in FIG. 6A which is used in a receiver.

Furthermore, it is assumed that the transceiving unit array is disposed in the transmitter device (for example, base station) and the base station transmits the wireless communication signals to the mobile phone through the transceiving unit array in the embodiments with reference to FIG. 13 to FIG. 22A and FIG. 22B. However, the transceiving units of the transceiving unit array may be disposed in the receiver device for reception purposes in real applications. FIG. 23A and FIG. 23B illustrate that the transceiving circuit is used for a transmitter and a receiver, respectively. Furthermore, the transceiving unit array is not only used in the base station. FIG. 24A, FIG. 24B and FIG. 24C illustrate that the transceiving unit array is disposed in the transmitter device and/or receiver.

Please refer to FIG. 23A, a schematic diagram illustrating the transceiving circuit in FIG. 6A which is used in a transmitter. After the first phase feeding path 437*a* receives the internal transmission signal Sint_tr from the first end of the lengthwise edge e2 of the radiation slice 431, a first phase transmission signal Str_sft1 is generated. After the second phase feeding path 437*b* receives the internal transmission signal Sint_tr from the first end 431*a* of the lengthwise edge of the radiation slice 431, a second phase transmission signal Str_sft2 is generated. As described with reference to FIG. 6A and FIG. 6B, the first phase transmission signal Str_sft1 and the second phase transmission signal Str_sft2 are opposite signals.

One end of the phase switch 433*a* is electrically connected to one of the first phase feeding path 437*a* and the second phase feeding path 437*b*. The other end of the phase switch 433*a* is electrically connected to the phase shifter 433*b*. After the phase shifter 433*b* receives the first phase transmission signal Str_sft1 or the second phase transmission signal Str_sft2, a phase shift is introduced to the received first phase transmission signal Str_sft1 or the received second phase transmission signal Str_sft2 to generate a shifted transmission signal Str_sft. The attenuator 433*c* adjusts the strength of the shifted transmission signal Str_sft and generates an attenuated transmission signal Str_dec.

When the transceiving circuit 433 is used for transmission, the functional switch 433*d* conducts connection between the attenuator 433*c* and the transmitting amplifier 433*f*, and the functional switch 433*g* conducts connection between the transmitting amplifier 433*f* and the external feeding path 435. The attenuated transmission signal Str_dec generated from the attenuator 433c is transmitted to the transmitting amplifier 433f through the functional switch 433d. Then, the transmitting amplifier 433f adjusts the strength of the attenuated transmission signal Str_dec and generates the external transmission signal Sext_tr. The functional switch 433g transmits the external transmission signal Sext_tr generated by the transmitting amplifier 433f to the external feeding path 435. The external feeding path 435 feeds the external transmission signal Sext_tr to the second end 431b of the lengthwise edge e2 of the radiation slice 431.

Please refer to FIG. 23B, a schematic diagram illustrating the transceiving circuit in FIG. 6A which is used in a receiver. When the transceiving circuit 433 is used for reception, the external feeding path 435 receives the external transmission signal Sext_tr through the second end 431b of the lengthwise edge e2 of the radiation slice 431. After the functional switch 433g conducts the external reception signal Sext_rv to the low noise amplifier 433e, the low noise amplifier 433e generates a low noise reception signal Srv_namp.

At this time, the functional switch 433d conducts connection between the attenuator 433c and the low noise amplifier 433e. Therefore, the attenuator 433c receives the low noise reception signal Srv_namp and adjusts the strength of the low noise reception signal Srv_namp to generate an attenuated reception signal Srv_dec. The phase shifter 433b introduces the phase shift to the attenuated reception signal Srv_dec to generate a shifted reception signal Srv_sft. The first phase feeding path 437a receives the shifted reception signal Srv_sft through the phase switch 433a, and generates a first phase reception signal Srv_sft1 and feeds the first phase reception signal Srv_sft1 into the first end 431a of the lengthwise edge of the radiation slice 431. The second phase feeding path 437b receives the shifted reception signal Srv_sft through the phase switch 433a, and generates a second phase reception signal Srv_sft2 and feeds the second phase reception signal Srv_sft2 into the first end 431a of the lengthwise edge of the radiation slice 431. The phase switch 433a conducts connection between the phase shifter 433b and one of the first phase feeding path 437a and the second phase feeding path 437b. If the phase switch 433a conducts connection between the phase shifter 433b and the first phase feeding path 437a, the radiation slice 431 takes the first phase reception signal Srv_sft1 as the internal reception signal Sint_rv. If the phase switch 433a conducts connection between the phase shifter 433b and the second phase feeding path 437a, the radiation slice 431 takes the second phase reception signal Srv_sft2 as the internal reception signal Sint_rv. As shown in FIG. 6A and FIG. 6B, the first phase reception signal Srv_Sft1 and the second phase reception signal Srv_sft2 are opposite signals.

According to the embodiments of the present disclosure, the transceiving unit array may be disposed in different communication devices (for example, mobile phone, base station, handheld device). The following FIG. 24A~FIG. 24C illustrate that the transceiving unit array may be disposed in the mobile phone or the base station to transmit and/or receive wireless communication signals.

Please refer to FIG. 24A, a schematic diagram illustrating that the transceiver unit array is only disposed in a first communication device. In the communication system 81, the first communication device 811 is in communication with the second communication device 813 via the wireless communication network 815. It is assumed that the base station 811a serving as the first communication device 811 includes the transceiving unit array 811b, and the mobile phone 813a serving as the second communication device 813 does not include any transceiving unit array.

Please refer to FIG. 24B, a schematic diagram illustrating that the transceiver unit array is only disposed in a second communication device. In the communication system 83, the first communication device 831 is in communication with the second communication device 833 via the wireless communication network 835. It is assumed that the base station 831a serving as the first communication device 831 does not include any transceiving unit array, and the mobile phone 833a serving as the second communication device 833 includes the transceiving unit array 833b.

Please refer to FIG. 24C, a schematic diagram illustrating that the transceiver unit arrays are disposed in both the first communication device and the second communication device. In the communication system 85, the first communication device 851 is in communication with the second communication device 853 via the wireless communication network 855. It is assumed that the base station 851a serving as the first communication device 851 includes the transceiving unit array 851b, and the mobile phone 853a serving as the second communication device 853 includes the transceiving unit array 853b.

According to the description with reference to FIG. 24A~FIG. 24C, it shows that the use of the transceiving unit array of the present disclosure is flexible and it may be used with various communication devices.

As described above, more transceiving units are disposed in the transceiver of the present disclosure so that lower power amplifiers are applicable. Thus, the transceiver requires lower DC power so that it is advantageous to heat dispersion and dissipation in the transceiver. Furthermore, because of wireless signal transmission and reception between the feeding antenna and the radiation slices, the complexity of controlling the transceiving unit array by the controller decreases. In addition, the present disclosure considers both the power gain and wiring complexity and provides more flexible and better applications. For example, by using the transceiving unit array of the present disclosure, the normal direction of the plane wave is changeable to achieve beam-steering. Moreover, the transceiving unit array of the present disclosure transmits and/or receives the wireless communication signals at different polarization so as to increase channel capacity and achieve MIMO function.

In conclusion, although the present invention has been disclosed in above preferred embodiments, it is not intended to limit the present invention. For those skilled in the art, various modifications and variations can be made within the spirit and scope of the present invention. Therefore, a true scope of the present invention is indicated by the following claims.

What is claimed is:

1. A transmitter for transmitting at least a first external transmission signal at first polarization and transmitting at least a second external transmission signal at second polarization, the transmitter comprising:
   a plurality of first transceiving units, each of the first transceiving units comprising:
      a first radiation slice having a first widthwise edge and a first lengthwise edge parallel to a first direction and a third direction, respectively; and
      a first transceiving circuit disposed on the first radiation slice, for receiving at least a first internal transmission signal at the first polarization from a first end of the first lengthwise edge, performing first transmitting-transformation of the at least a first internal transmission signal to generate the at least a first external transmission signal, and feeding the at least a first external transmission signal into a second end of the first lengthwise edge; and a plurality of second transceiving units, each of the second transceiving units comprising:
- a second radiation slice having a second widthwise edge and a second lengthwise edge parallel to a second direction and the third direction, respectively; and
- a second transceiving circuit disposed on the second radiation slice, for receiving at least a second internal transmission signal at the second polarization from a first end of the second lengthwise edge, performing second transmitting-transformation of the at least a second internal transmission signal to generate the at least a second external transmission signal, and feeding the at least a second external transmission signal into a second end of the second lengthwise edge, wherein the first polarization and the second polarization are orthogonal to each other, and the first direction, the second direction and the third direction are orthogonal to each other.

2. The transmitter according to claim 1, wherein the at least a first internal transmission signal and the at least a second internal transmission signal are transmitted from a first feeding antenna.

3. The transmitter according to claim 2, wherein
- a relative distance between the first end of the first lengthwise edge and the first feeding antenna is shorter than a relative distance between the second end of the first lengthwise edge and the first feeding antenna; and
- a relative distance between the first end of the second lengthwise edge and the first feeding antenna is shorter than a relative distance between the second end of the second lengthwise edge and the feeding antenna.

4. The transmitter according to claim 1, wherein the at least a first internal transmission signal is transmitted from a second feeding antenna, and the at least a second internal transmission signal is transmitted from a third feeding antenna.

5. The transmitter according to claim 1, wherein the at least a first external transmission signal and the at least a second external transmission signal are received by a first receiver device.

6. The transmitter according to claim 5, wherein
- a relative distance between the second end of the first lengthwise edge and the first receiver device is shorter than a relative distance between the first end of the first lengthwise edge and the first receiver device; and
- a relative distance between the second end of the second lengthwise edge and the first receiver device is shorter than a relative distance between the first end of the second lengthwise edge and the first receiver device.

7. The transmitter according to claim 1, wherein the at least a first external transmission signal is received by a second receiver device, and the at least a second external transmission signal is received by a third receiver device.

8. The transmitter according to claim 1, wherein the first transceiving circuit comprises:
- a first first phase feeding path electrically connected to the first radiation slice, for receiving the at least a first internal transmission signal from the first end of the first lengthwise edge to generate a first first phase transmission signal;
- a first second phase feeding path electrically connected to the first radiation slice, for receiving the at least a first internal transmission signal from the first end of the first lengthwise edge to generate a first second phase transmission signal, wherein the first first phase transmission signal and the first second phase transmission signal are opposite signals;
- a first phase switch electrically connected to the first first phase feeding path and the first second phase feeding path;
- a first phase shifter electrically connected to the first phase switch, for receiving one of the first first phase transmission signal and the first second phase transmission signal through the first phase switch and providing a phase shift to the one of the phase transmission signals to generate a first shifted transmission signal, wherein the at least a first external transmission signal is generated by adjusting strength of the first shifted transmission signal.

9. The transmitter according to claim 1, wherein the second transceiving circuit comprises:
- a second first phase feeding path electrically connected to the second radiation slice, for receiving the at least a second internal transmission signal from the first end of the second lengthwise edge to generate a second first phase transmission signal;
- a second second phase feeding path electrically connected to the second radiation slice, for receiving the at least a second internal transmission signal from the first end of the second lengthwise edge to generate a second second phase transmission signal, wherein the second first phase transmission signal and the second second phase transmission signal are opposite signals;
- a second phase switch electrically connected to the second first phase feeding path and the second second phase feeding path;
- a second phase shifter electrically connected to the second phase switch, for receiving one of the second first phase transmission signal and the second second phase transmission signal through the second phase switch and providing a phase shift to the one of the phase transmission signals to generate a second shifted transmission signal, wherein the at least a second external transmission signal is generated by adjusting strength of the second shifted transmission signal.

10. The transmitter according to claim 1, wherein the first radiation slice and the second radiation slice are made of a conductive material, and each of the first end of the first lengthwise edge of the first radiation slice, the second end of the first lengthwise edge of the first radiation slice, the first end of the second lengthwise edge of the second radiation slice and the second end of the second lengthwise edge of the second radiation slice has a tapered slot antenna structure.

11. The transmitter according to claim 1, wherein length of the first lengthwise edge is equal to length of the second lengthwise edge, and length of the first widthwise edge is equal to length of the second widthwise edge.

12. The transmitter according to claim 1, wherein the first lengthwise edge of the first radiation slice is connected to the second lengthwise edge of the second radiation slice, and the first radiation slice is orthogonal to the second radiation slice.

13. The transmitter according to claim 1, wherein the first transceiving units and the second transceiving units form a grid structure having M columns and N rows at a plane, wherein a row direction of the grid structure is parallel to the first direction and a column direction of the grid structure is parallel to the second direction, wherein the first widthwise edge of the first radiation slice of each of the first transceiving units is parallel to the row direction, and the second widthwise edge of the second radiation slice of each of the second transceiving units is parallel to the column direction.

14. The transmitter according to claim 1, wherein the first polarization is one of horizontal polarization and vertical polarization, and the second polarization is the other of the horizontal polarization and the vertical polarization.

15. A receiver for receiving at least a first external reception signal at first polarization and receiving at least a second external reception signal at second polarization, the receiver comprising:

a plurality of first transceiving units, each of the first transceiving units comprising:
   a first radiation slice having a first widthwise edge and a first lengthwise edge parallel to a first direction and a third direction, respectively; and
   a first transceiving circuit disposed on the first radiation slice, for receiving the at least a first external reception signal from a second end of the first lengthwise edge, performing first receiving-transformation of the at least a first external reception signal to generate at least a first internal reception signal at the first polarization, and feeding the at least a first internal reception signal into a first end of the first lengthwise edge; and a plurality of second transceiving units, each of the second transceiving units comprising:
   a second radiation slice having a second widthwise edge and a second lengthwise edge parallel to a second direction and the third direction, respectively; and
   a second transceiving circuit disposed on the second radiation slice, for receiving the at least a second external reception signal from a second end of the second lengthwise edge, performing second receiving-transformation of the at least a second external reception signal to generate at least a second internal reception signal at the second polarization, and feeding the at least a second internal reception signal into a first end of the second lengthwise edge, wherein the first polarization and the second polarization are orthogonal to each other, and the first direction, the second direction and the third direction are orthogonal to each other.

16. The receiver according to claim 15, wherein the first transceiving circuit comprises:

a first phase shifter for providing a phase shift to the at least a first external reception signal after strength of the first external reception signal is adjusted and generating a first shifted reception signal;
a first phase switch electrically connected to the first phase shifter;
a first first phase feeding path electrically connected to the first phase switch and the first radiation slice, for receiving the first shifted reception signal through the first phase switch, generating a first first phase reception signal, and feeding the first first phase reception signal into the first end of the first lengthwise edge; and
a first second phase feeding path electrically connected to the first phase switch and the first radiation slice, for receiving the first shifted reception signal through the first phase switch, generating a first second phase reception signal, and feeding the first second phase reception signal into the first end of the first lengthwise edge, wherein the first phase switch conducts connection between the first phase shifter and one of the first first phase feeding path and the first second phase feeding path, and the first first phase reception signal and the first second phase reception signal are opposite signals.

17. The receiver according to claim 15, wherein the second transceiving circuit comprises:

a second phase shifter for providing a phase shift to the at least a second external reception signal after strength of the second external reception signal is adjusted and generating a second shifted reception signal;
a second phase switch electrically connected to the second phase shifter;
a second first phase feeding path electrically connected to the second phase switch and the second radiation slice, for receiving the second shifted reception signal through the second phase switch, generating a second first phase reception signal, and feeding the second first phase reception signal into the first end of the second lengthwise edge; and
a second second phase feeding path electrically connected to the second phase switch and the second radiation slice, for receiving the second shifted reception signal through the second phase switch, generating a second second phase reception signal, and feeding the second second phase reception signal into the first end of the second lengthwise edge, wherein the second phase switch conducts connection between the second phase shifter and one of the second first phase feeding path and the second second phase feeding path, and the second first phase reception signal and the second second phase reception signal are opposite signals.

18. The receiver according to claim 15, wherein the first radiation slice and the second radiation slice are made of a conductive material, and each of the first end of the first lengthwise edge of the first radiation slice, the second end of the first lengthwise edge of the first radiation slice, the first end of the second lengthwise edge of the second radiation slice and the second end of the second lengthwise edge of the second radiation slice has a tapered slot antenna structure.

19. The receiver according to claim 15, wherein the first transceiving units and the second transceiving units form a grid structure having M columns and N rows at a plane, wherein a row direction of the grid structure is parallel to the first direction and a column direction of the grid structure is parallel to the second direction, wherein the first widthwise edge of the first radiation slice of each of the first transceiving units is parallel to the row direction, and the second widthwise edge of the second radiation slice of each of the second transceiving units is parallel to the column direction.

20. The receiver according to claim 15, wherein length of the first lengthwise edge is equal to length of the second lengthwise edge, and length of the first widthwise edge is equal to length of the second widthwise edge, wherein the first lengthwise edge of the first radiation slice is connected to the second lengthwise edge of the second radiation slice, and the first radiation slice is orthogonal to the second radiation slice.

* * * * *